(12) United States Patent
Zhang et al.

(10) Patent No.: US 11,303,197 B2
(45) Date of Patent: Apr. 12, 2022

(54) LOW PASS FILTER, SWITCH CONTROL CIRCUIT, DRIVING SYSTEM, CHIP AND METHOD

(71) Applicant: SHANGHAI BRIGHT POWER SEMICONDUCTOR CO., LTD., Shanghai (CN)

(72) Inventors: Fuqiang Zhang, Shanghai (CN); Xiaoru Gao, Shanghai (CN)

(73) Assignee: SHANGHAI BRIGHT POWER SEMICONDUCTOR CO., LTD., Shanghai (CN)

( * ) Notice: Subject to any disclaimer, the term of this patent is extended or adjusted under 35 U.S.C. 154(b) by 0 days.

(21) Appl. No.: 17/193,650

(22) Filed: Mar. 5, 2021

(65) Prior Publication Data

US 2021/0194350 A1 Jun. 24, 2021

Related U.S. Application Data

(63) Continuation of application No. PCT/CN2018/104207, filed on Sep. 5, 2018.

(51) Int. Cl.
  *H02M 1/00* (2006.01)
  *H02M 1/15* (2006.01)
  *H05B 45/36* (2020.01)
  *H05B 45/3725* (2020.01)

(52) U.S. Cl.
  CPC .............. *H02M 1/15* (2013.01); *H05B 45/36* (2020.01); *H05B 45/3725* (2020.01); *H02M 1/0012* (2021.05); *H02M 1/0025* (2021.05)

(58) Field of Classification Search
  CPC .... H02M 1/0009; H02M 1/0025; H02M 1/15; H05B 45/36; H05B 45/3725
  See application file for complete search history.

(56) References Cited

U.S. PATENT DOCUMENTS

| 10,536,082 B2* | 1/2020 | Imade ...................... H03K 5/24 |
| 10,622,896 B1* | 4/2020 | Eggermont ............. H02M 1/44 |
| 2009/0295776 A1* | 12/2009 | Yu ...................... H05B 45/3725 345/212 |

(Continued)

FOREIGN PATENT DOCUMENTS

| CN | 1124533 A | 6/1996 |
| CN | 107426880 A | 12/2017 |

(Continued)

*Primary Examiner* — Jue Zhang
(74) *Attorney, Agent, or Firm* — Muncy, Geissler, Olds & Lowe, P.C.

(57) ABSTRACT

A low-pass filter, a switching control circuit, a driving system, a chip and methods are disclosed. The low-pass filter performs digital differential-integral process on a voltage of an acquired analog signal and a predefined reference voltage to generate differential-integral signals, accumulates a count of the differential-integral signals, and convert the result to an analog signal. By performing differential-integral process accumulating a count of the differential-integral signals, a low-pass filtered signal is obtained in a way that solves the problem of low integrity of circuits in conventional driving systems, reduces the complexity of external circuits for such driving systems and increases their circuit stability.

19 Claims, 8 Drawing Sheets

(56) References Cited

U.S. PATENT DOCUMENTS

| | | | | |
|---|---|---|---|---|
| 2011/0254462 A1* | 10/2011 | Ruan | ...................... | H05B 45/38 |
| | | | | 315/291 |
| 2014/0354186 A1* | 12/2014 | Sun | ...................... | H05B 45/385 |
| | | | | 315/310 |
| 2017/0318639 A1* | 11/2017 | Wang | ................... | H05B 45/395 |
| 2020/0389959 A1* | 12/2020 | Imade | ................... | H02M 1/15 |

FOREIGN PATENT DOCUMENTS

| | | |
|---|---|---|
| CN | 107426881 A | 12/2017 |
| CN | 107809604 A | 3/2018 |

\* cited by examiner

US 11,303,197 B2

LOW PASS FILTER, SWITCH CONTROL CIRCUIT, DRIVING SYSTEM, CHIP AND METHOD

CROSS-REFERENCES TO RELATED APPLICATION

This application is a continuation of International Patent Application No. PCT/CN2018/104207, filed on Sep. 5, 2018, entitled "LOW-PASS FILTER, SWITCH CONTROL CIRCUIT, DRIVING SYSTEM, CHIP AND METHOD", and the entire disclosure of which is incorporated herein.

TECHNICAL FIELD

The present application relates to the field of driver circuits and, in particular, to a low-pass filter, a switching control circuit, a driving system, a chip and methods.

BACKGROUND

In DC driver circuits, power adapters and other electronic products capable of using AC power for powering of DC loads, low-pass filters (also known as low-pass filtering circuits or low-pass filtering units) are included primarily to filter internal signals. In order to achieve smoother DC output, existing low-pass filters usually utilize the charge and discharge capabilities of capacitors to suppress voltage pulsations and ripples. Moreover, in order to achieve improved filtering capabilities, low-pass filters in driver circuits, power adapters and other products are generally low-bandwidth ones incorporating filtering capacitors with high capacitance, and thus not suitable for integration with integrated circuits or chips.

SUMMARY OF THE INVENTION

In view of this, it is an objective of the present application to overcome the above-described integration problem with conventional low-pass filters in AC/DC electronic devices by presenting a low-pass filter, a switching control circuit, a driving system, a chip and methods.

In order to accomplish the above and other related objectives, in a first aspect of the present application, there is provided a low-pass filter, the low-pass filter including: a differential-integral module configured to generate, depending on a differential-integral signal of a previous unit interval, a first differential signal based on a voltage of an analog sample signal and a second differential signal based on a predefined voltage, to perform an integral process on the first differential signal and the second differential signal, and to generate a differential-integral signal of a current unit interval based on the integrated signals and feed the differential-integral signal of the current unit interval back to the differential-integral module; and a digital-to-analog conversion module connected to the differential-integral module, the digital-to-analog conversion module configured to perform an additive counting operation or a subtractive counting operation on the differential-integral signal generated by the differential-integral module, and to convert a result of the additive or subtractive counting operation into an analog signal.

In a second aspect of the present application, there is provided a switching control circuit for controlling a switching circuit which is configured to switch on or off a line circuit connected to a power bus, the switching control circuit including: a low-pass filter including: a differential-integral module configured to generate, depending on a differential-integral signal of a previous unit interval, a first differential signal based on a voltage of an analog sample signal and a second differential signal based on a predefined voltage, to perform an integral process on the first differential signal and the second differential signal, and to generate a differential-integral signal of a current unit interval based on the integrated signals and feed the differential-integral signal of the current unit interval back to the differential-integral module; and a digital-to-analog conversion module connected to the differential-integral module, the digital-to-analog conversion module configured to perform an additive counting operation or a subtractive counting operation on the differential-integral signal generated by the differential-integral module, and to convert a result of the additive or subtractive counting operation into an analog signal; and a control unit coupled to the low-pass filter, the control unit configured to count a switch-on time period of the switching circuit based on the analog signal and to control the switching circuit to be switched off upon expiry of the switch-on time period.

In a third aspect of the present application, there is provided a chip including a switching control circuit for controlling a switching circuit which is configured to switch on or off a line circuit connected to a power bus, the switching control circuit including: a low-pass filter including: a differential-integral module configured to generate, depending on a differential-integral signal of a previous unit interval, a first differential signal based on a voltage of an analog sample signal and a second differential signal based on a predefined voltage, to perform an integral process on the first differential signal and the second differential signal, and to generate a differential-integral signal of a current unit interval based on the integrated signals and feed the differential-integral signal of the current unit interval back to the differential-integral module; and a digital-to-analog conversion module connected to the differential-integral module, the digital-to-analog conversion module configured to perform an additive counting operation or a subtractive counting operation on the differential-integral signal generated by the differential-integral module, and to convert a result of the additive or subtractive counting operation into an analog signal; and a control unit coupled to the low-pass filter, the control unit configured to count a switch-on time period of the switching circuit based on the analog signal and to control the switching circuit to be switched off upon expiry of the switch-on time period.

DETAILED DESCRIPTION

Embodiments of the present application will be described below by means of particular examples. Other advantages and benefits of the present application can be readily appreciated by those familiar with the art from the disclosure herein.

In the following description, reference is made to the accompanying drawings, which illustrate a few embodiments of the present application. It should be understood that other embodiments may also be used and that changes can be made in terms of mechanical composition, structure, electrics and operation without departing from the spirit and scope of the present disclosure. Accordingly, the following detailed description should not be considered to be restrictive, and the scope of embodiments of the present application is only defined by the claims of the published patent. All terms used herein are only intended to describe particular embodiments, rather than limiting the present application in any sense.

Although the terms "first", "second", etc. are used herein in the description of some embodiments to describe various elements, these elements should not be construed as being limited by the terms. These terms are only intended to distinguish among different elements. For example, a first control signal can be referred to instead as a "second control signal", and vice versa, without departing the scope of the various disclosed embodiments. However, unless the context clearly indicates otherwise, they are not the same control signal.

Furthermore, as used herein, the singular forms "a", "an" and "the" are intended to include the plural forms as well, unless the context dictates to the contrary. It will be further understood that the terms "comprises" and/or "comprising", when used in this specification, specify the presence of stated features, steps, operations, elements, components and/or groups, but do not preclude the presence or addition of one or more other features, steps, operations, elements, components, and/or groups thereof. As used herein, the terms "or" and "and/or" are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive. Additionally, "ground voltage" and "digital ground voltage" as used herein refers to a voltage at a connection to the ground or the ground of digital circuits in a driver circuit or the like. The phrase "switch-on time period" refers to a time period during which a switching circuit is conductive or on, providing a current path.

Figure 1:
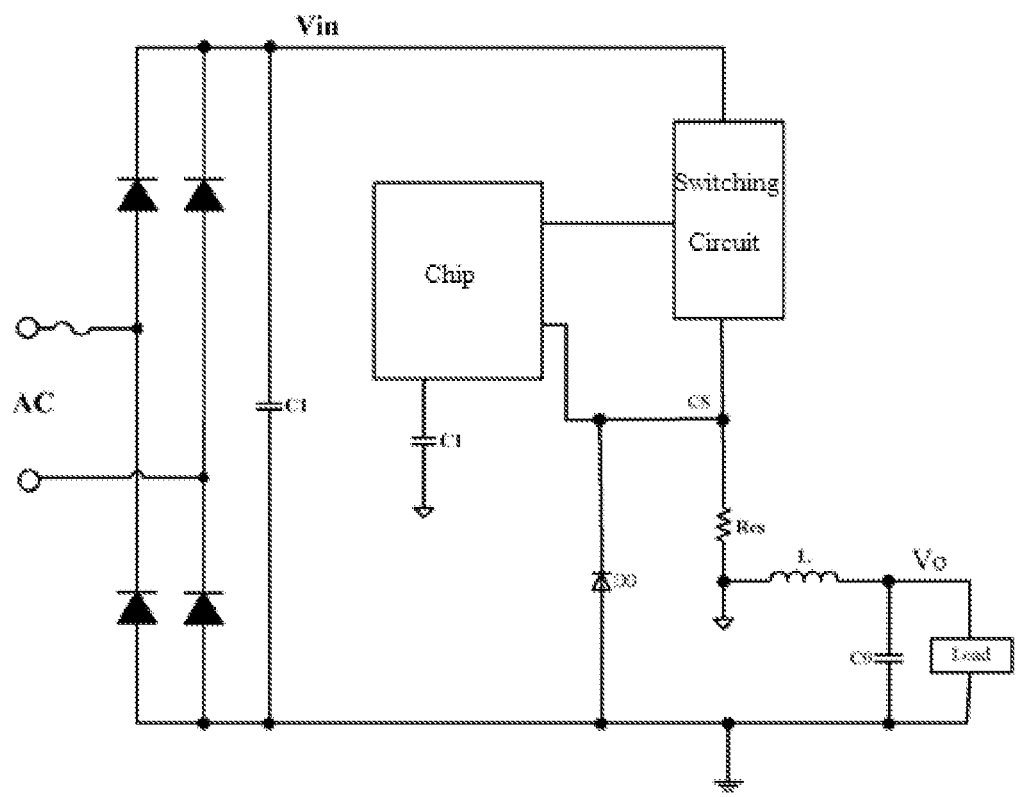
FIG. 1 shows a schematic diagram of a driver circuit for an LED light.

With a driver circuit for an LED light as an example, reference is now made to FIG. 1, a schematic diagram of the structure of the driver circuit for the LED light. As shown, the chip has a pin, which is configured to connect a capacitor C1 to enable low-pass filtering of internal signals in the chip. Since the capacitor C1 is a high-capacitance one, it could not be integrated in the chip. This leads to not only an increased overall size of the driver circuit but also a raised risk of unstable external connection of the circuit.

In order to enable higher integration of this driver circuit and other similar circuit incorporating a low-pass filter, which are intended to use AC power to provide a load with DC power, the present application provides a low-pass filter in a driving system. The low-pass filter can be either integrated in a chip, or configured on a PCB by means of circuit welding depending on the structure of a circuit system where the low-pass filter is applied. Moreover, the low-pass filter can be also applied to other circuit devices used for filtering out high-frequency signals and outputting low-frequency signals, such as signal generators. The low-pass filter is adapted to perform digital differential-integral processes between a voltage of an acquired analog signal and a predefined reference voltage to generate differential-integral signals, and to accumulate a count of the differential-integral signals to convert the accumulative result to a filtered analog signal.

The low-pass filter may perform the differential-integral processes on the acquired analog signal on the basis of a unit interval derived from a clock signal, and the resulting differential-integral signals may be in the form of high/low voltage levels and vary with the acquired analog signal on the basis of the unit interval. The unit interval may span over one or N cycles of the clock signal, where N>1. In order to be compatible with circuit components in proceeding and succeeding stages, the output signal from the low-pass filter must be an electrical signal that can be processed by the circuit components. To this end, the low-pass filter may accumulate a count of the differential-integral signals to obtain the filtered signal that varies on the basis of the unit interval. The filtered signal is an electrical signal reflecting the result of the acquired analog signal processed from the low-pass filtering. Depending on the practical circuit design requirements and the resolution of circuits, a frequency of the clock signal, some internal reference voltages (e.g., step voltages, voltage amplitudes), as well as analog and digital components may be selected for the low-pass filter. Depending on the signal processing method, the low-pass filter may be a first-order low-pass filter, a second-order low-pass filter, or the like.

Figure 2:
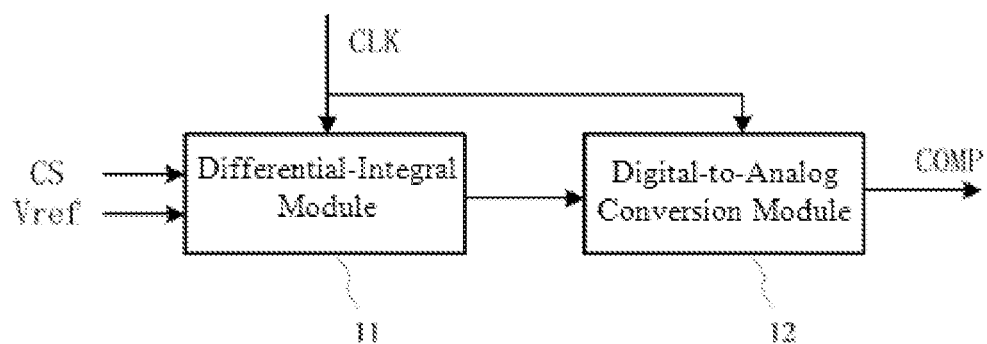
FIG. 2 shows a schematic diagram of a low-pass filter according to an embodiment of the present application.

In some embodiments, since a rectified AC waveform in a driving circuit supplying DC power and a waveform of the load driven by the driving circuit both feature periodic half-sine envelopes, the low-pass filter may perform the low-pass filtering process on the acquired analog signal in a fully differential-integral manner. Reference is now made to FIG. 2, a schematic diagram of the low-pass filter according to an embodiment of the present application. As shown, the low-pass filter may include a differential-integral module 11 and a digital-to-analog conversion module 12.

The differential-integral module 11 may be configured to perform fully differential-integral processes on the voltage of the acquired analog signal (i.e., an analog sample signal) and the predefined reference voltage based on respective differential-integral signals fed back on the basis of the unit interval, and to output 1-bit differential-integral signals (each of which presents one digital bit).

Since a waveform with half-sine envelopes contains both monotonically rising and falling portions, the differential-integral module implements a differential-integral process between ($V_{CS} \pm V_{FS}$) and a reference voltage $V_{ref}$. To realize the differential-integral process, the differential-integral module is configured with a circuit structure for performing a differential process selected from between the analog sample signal and a step voltage, or between the reference voltage and the step voltage, depending on a differential-integral signal of the previous unit interval. Furthermore, the differential-integral module is configured with another circuit structure for performing an integral process on two signals from the differential process and thus obtaining a 1-bit digital differential-integral signal of the current unit interval, which is described by a high/low voltage level. Here, $V_{CS}$ denotes the voltage of the acquired analog signal, and $V_{FS}$ represents the step voltage, which may be provided either by an internal reference voltage, or by the high voltage level of the differential-integral signal.

The 1-bit differential-integral signal from the differential-integral module describes, in the form of the high/low voltage level, a transition of the voltage of the acquired analog signal relative to the reference voltage after the differential-integral process. For example, the output of the differential-integral module may be low voltage level when ($V_{CS}-V_{FS}$)>$V_{ref}$, and the output of the differential-integral module may be high voltage level when ($V_{CS}+V_{FS}$)<$V_{ref}$. It is to be noted that the transition of the voltage of the analog signal relative to the reference voltage, which is represented in the form of the high/low voltage level of the 1-bit differential-integral signal output from the differential-integral module, may be represented in other forms depending on the internal circuit structures of the differential-integral module and the digital-to-analog conversion module connected to the differential-integral module, rather than being limited to waveforms defined by differential-integral signals presented in various exemplary embodiments of the present application.

Figure 3:
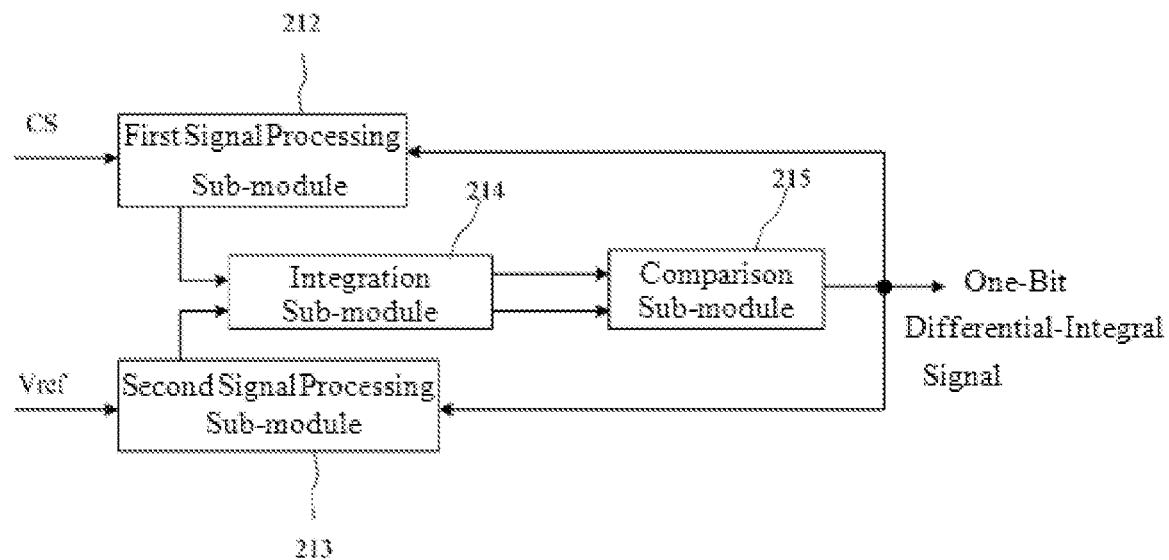
FIG. 3 shows a schematic diagram of the structure of a differential-integral module in a low-pass filter according to an embodiment of the present application.

Since the high/low voltage level of differential-integral signal depends on, among others, the circuit components and the internal reference voltage, in order to enable accurate response of some circuit components of the differential-integral module to the fed-back differential-integral signal, in some examples, the differential-integral module may adopt the structure as described below for outputting the differential-integral signal. Reference is now made to FIG. 3, a schematic diagram of an embodiment of the differential-integral module. As shown, the differential-integral module may include a first signal processing sub-module 212, a second signal processing sub-module 213, an integration sub-module 214 and a comparison sub-module 215. The first and second signal processing sub-module 212, 213 may together provide a feedback mechanism for the integration sub-module 214. The first and second signal processing sub-module 212, 213 may be individually configured to perform a full differential process between the voltage of the analog signal CS and the reference voltage $V_{ref}$ based on the fed-back differential-integral signal so that the integration sub-module 214 and the comparison sub-module 215 can perform an integral process and output the 1-bit differential-integral signal. Such 1-bit differential-integral signals define a waveform compatible with the circuit structure of the digital-to-analog conversion module, so that the digital-to-analog conversion module can convert the 1-bit differential-integral signals into a low-pass filtered signal COMP describing the analog signal CS.

In order to enable integration between the voltage of the analog signal CS and the reference voltage $V_{ref}$, the first and second signal processing sub-modules may be provided to inversely select a step voltage or a ground voltage in response to a differential-integral signal. The first signal processing sub-module may include a first switching sub-module and a first operation sub-module. The first switching sub-module may be configured to selectively output a predefined step voltage or a digital ground voltage under the control of a fed-back differential-integral signal. The first operation sub-module may be configured to receive the analog sample signal from the load and perform a differential process between the output voltage from the first switching sub-module and the voltage of the analog signal. The second signal processing sub-module may include a second switching sub-module and a second operation sub-module. The second switching sub-module may be configured to selectively output a predefined step voltage or a digital ground voltage under the control of a fed-back differential-integral signal. The second operation sub-module may be configured to perform a differential process between the output voltage from the second switching sub-module and the predefined reference voltage.

Each of the first and second operation sub-modules may include a subtractor for performing a voltage-based differential operation. The first and second switching sub-modules may include structurally mirrored sets of switching elements. Alternatively, the two switching sub-modules may include structurally identical sets of switching elements, with either of them including an inverter for inverting a fed-back differential-integral signal. In this way, the two switching sub-modules are under the control of respective control signals which are inverted with respect to each other.

For example, for a high-level fed-back differential-integral signal, the first switching sub-module may choose to output a step voltage $V_{FS}$ in response to the high level of the fed-back signal, the first operation sub-module may perform a differential process between the reference voltage $V_{ref}$ and the step voltage $V_{FS}$. At the same time, the second switching sub-module may choose to output the digital ground voltage in response to the high level of the fed-back signal, the second operation sub-module may perform a differential process between the reference voltage $V_{ref}$ and the digital ground voltage. On the contrary, for a low-level fed-back differential-integral signal, the first switching sub-module may choose to output the digital ground voltage in response to the low level of the fed-back signal, the first operation sub-module may perform a differential process between the reference voltage $V_{ref}$ and the digital ground voltage. Simultaneously, the second switching sub-module may choose to output a step voltage $V_{FS}$ in response to the low level of the fed-back signal, the second operation sub-module may perform a differential process between the reference voltage $V_{ref}$ and the step voltage $V_{FS}$.

Figure 16:
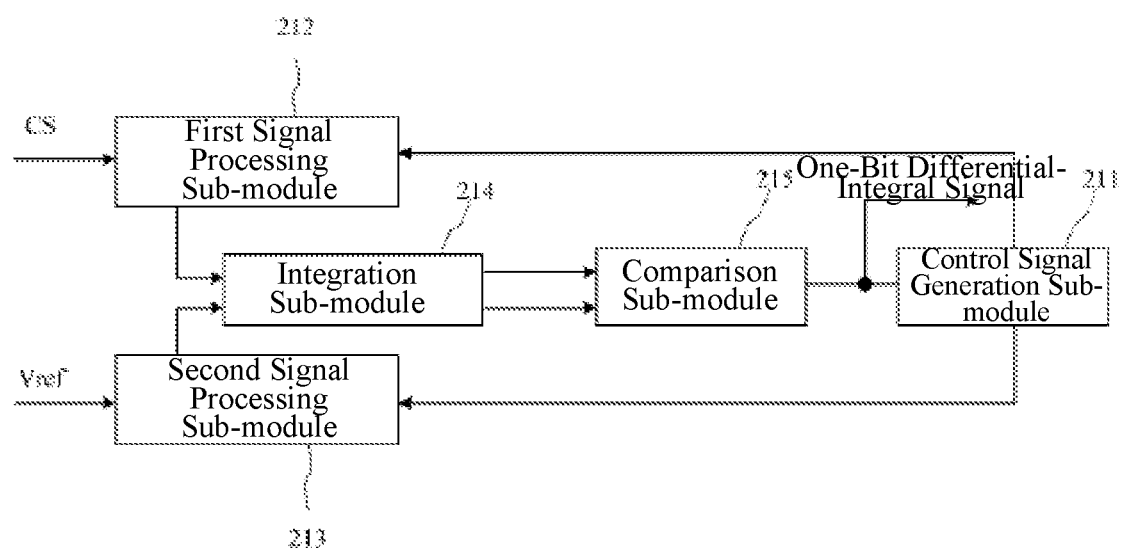
FIG. 16 shows a schematic diagram of a differential-integral module in a low-pass filter according to an embodiment of the present application.

In some embodiments, the differential-integral module may additionally include a control signal generation sub-module. Reference is now made to FIG. 16, a schematic diagram of another embodiment of the differential-integral module. The control signal generation sub-module may be configured to generate, from a 1-bit differential-integral signal, a first control signal and a second control signal that is inverted with respect to the first control signal. In this case, the first signal processing sub-module may perform a differential process between the voltage of the analog sample signal and a predefined step voltage under the control of the first control signal, while the second signal processing sub-module may perform a differential process between the predefined reference voltage and a step voltage under the control of the second control signal and thereby output a second differential signal.

It is to be noted that, in consideration of the logical relations of signals in the control signal generation sub-module, the first signal processing sub-module, the second signal processing sub-module, the integration sub-module, the comparison sub-module and the digital-to-analog conversion module, a 1-bit differential-integral signal as described herein is considered to be able to be inverted or otherwise processed, and still being able to indicate a transition of the voltage of the analog signal with respect to the reference voltage. Those skilled in the art may make adjustments about the phase of such 1-bit differential-integral signals or the circuit structure of the digital-to-analog conversion module to convert the 1-bit differential-integral signals into the low-pass filtered signal COMP describing the analog signal CS.

The control signal generation sub-module may be configured to generate mutually inverted first and second control signals from a differential-integral signal (i.e., a 1-bit differential-integral signal). In particular, from a fed-back differential-integral signal, the control signal generation sub-module may generate differential control signals, i.e., the first and second control signals, and output them respectively to the first and second signal processing sub-modules. The differential-integral signal received at an input of the control signal generation sub-module may be non-inverted or inverted with respect to that output to the digital-to-analog conversion module. In some examples, the control signal generation sub-module may be the last component of the differential-integral module, in order to invert a 1-bit differential-integral signal from the previous circuit component (or set of circuit components) and output the inverted and non-inverted versions of the differential-integral signal as the first and second control signals, respectively, to the first and second signal processing sub-modules 212, 213. For example, referring to FIG. 4, a schematic circuit diagram of an embodiment of the differential-integral module of FIG. 16, the control signal generation sub-module 211 may include an inverter coupled to an output of a comparator in the comparison sub-module 215, the first and second signal processing sub-modules 212, 213 are coupled to the output and an input of the inverter, respectively. In an alternative example, the control signal generation sub-module may be arranged in the same circuit branch as is the first or second signal processing sub-module 212, 213. For another example, referring to FIG. 5, a schematic circuit diagram of another embodiment of the differential-integral module of FIG. 16, the control signal generation sub-module 211 may include an inverter arranged in a circuit branch between the output of the comparator in the comparison sub-module 215 and the second signal processing sub-module 213. In this example, the first signal processing sub-module 212 may receive a differential-integral signal SEL as the first control signal from the output of the comparator. In addition, the second signal processing sub-module 213 may receive an inverted differential-integral signal as the second control signals from the inverter.

It is to be noted that providing the mutually inverted control signals from the input and output of the inverter is merely exemplary, and it should not be construed to limit the scope of the present application in any sense. Instead, the control signal generation sub-module may include a switching element or a set of switching elements configured for switching on/off based on a high (or low)-level 1-bit differential-integral signal. In this case, the control signal generation sub-module may generate the mutually inverted first and second control signals by means of switching on/off the switching element (or set of switching elements). Although not detailed herein, there are still many other possible alternative approaches.

Figure 4:
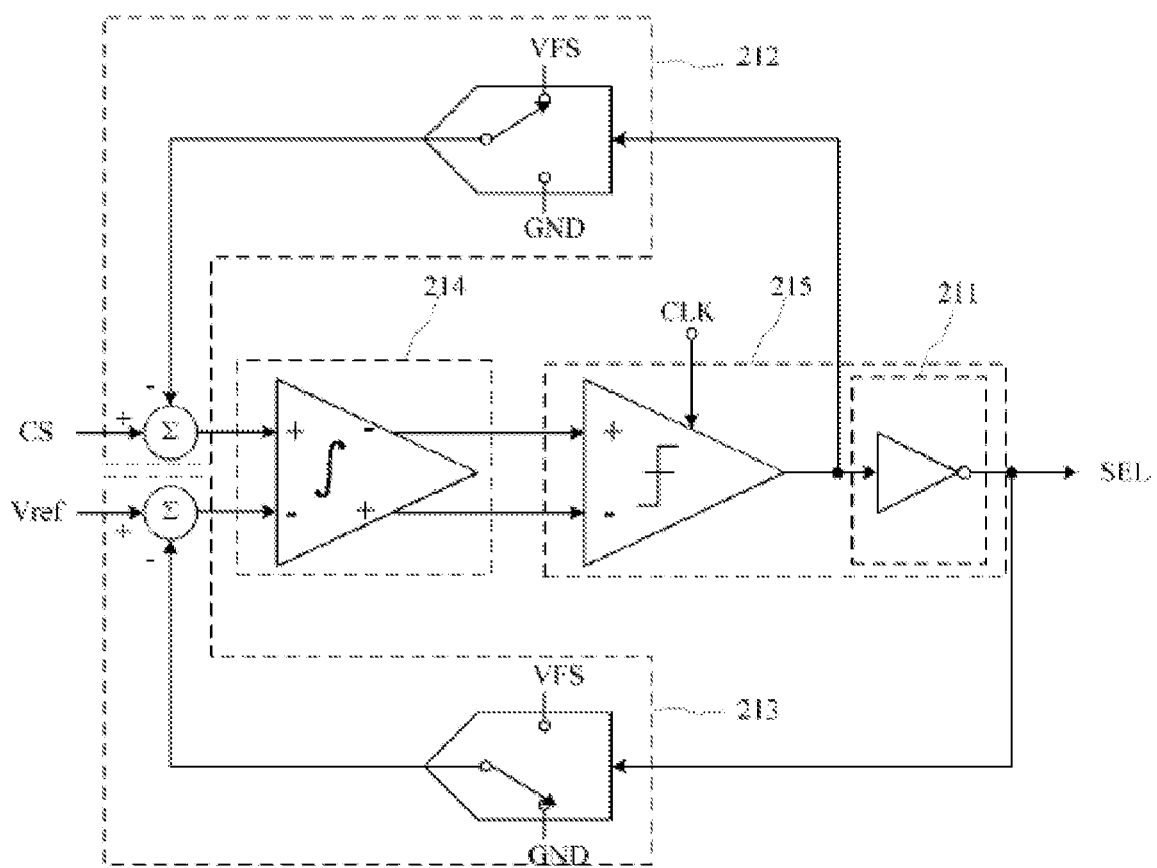
FIG. 4 shows a schematic diagram of the circuit of a differential-integral module in a low-pass filter according to an embodiment of the present application.
Figure 5:
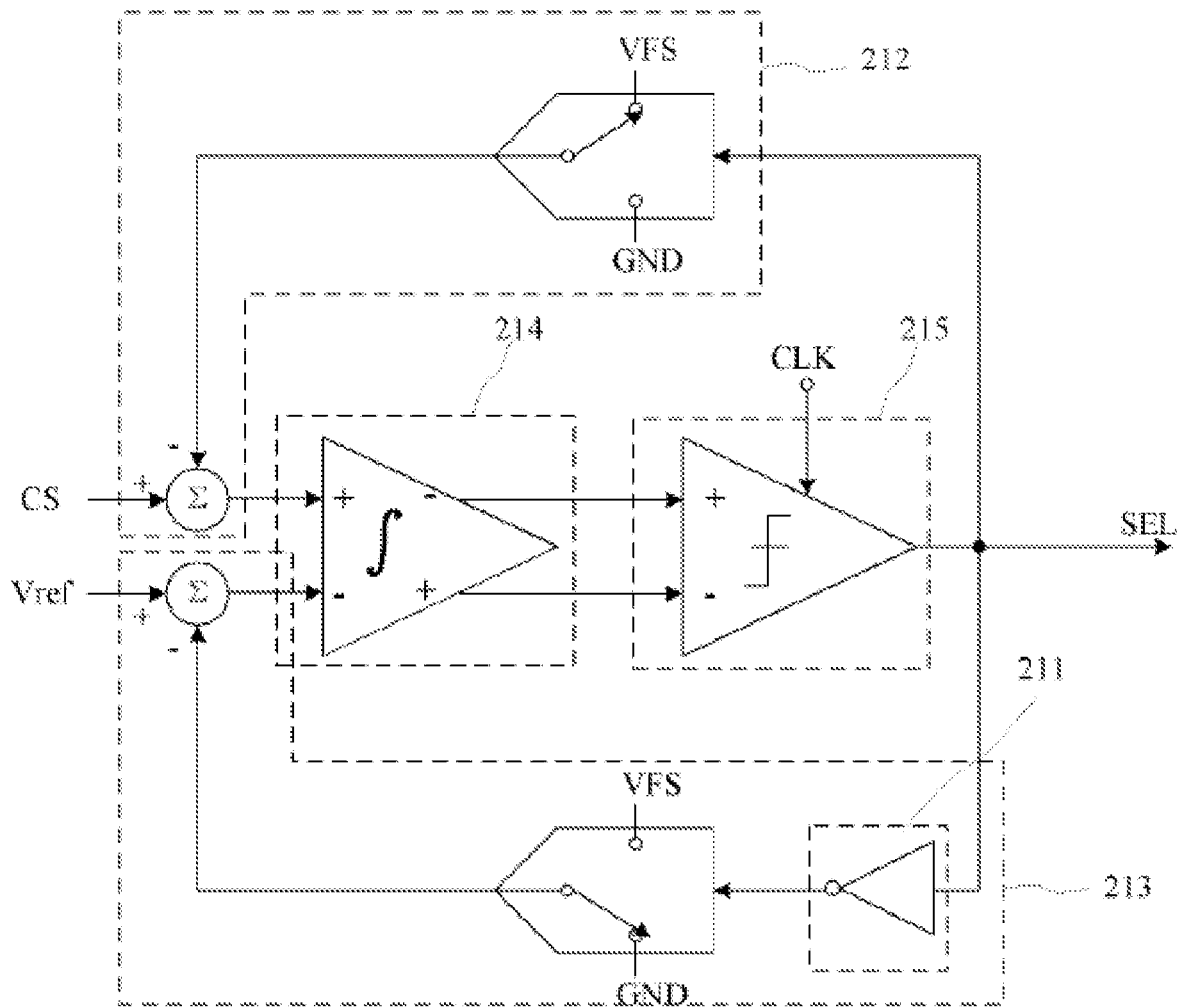
FIG. 5 shows a schematic diagram of the circuit of a differential-integral module in a low-pass filter according to another embodiment of the present application.

The first signal processing sub-module 212 may be configured to perform a differential process between the voltage of the analog signal and the predefined step voltage under the control of the first control signal and output a first differential signal resulting from the differential process. Here, if the first control signal is active (e.g., high voltage level), the first signal processing sub-module may perform a differential process between the analog signal and the predefined step voltage. Otherwise, if the first control signal is inactive (e.g., low voltage level), the first signal processing sub-module 212 may perform a differential process between the analog signal and a ground voltage, which is equivalent to directly outputting the analog signal to the integration sub-module. The step voltage may be provided either by an internal reference voltage or by the active voltage level of the first control signal. As shown in FIG. 4 or FIG. 5, the first signal processing sub-module 212 may include a first switching sub-module and a first operation sub-module. In particular, the first switching sub-module may include a switching element, which is controlled by the first control signal to choose between a step voltage $V_{FS}$ provided by a reference voltage and the digital ground voltage. After that, a subtractor in the first operation sub-module may perform a differential process between the acquired analog signal and $V_{FS}$ or the digital ground voltage, whichever is chosen by the first control signal, and output the first differential signal resulting from the differential process.

Similar to the first signal processing sub-module 212, the second signal processing sub-module 213 may be configured to perform a differential process between the predefined reference and the predefined step voltage under the control of the second control signal and output a second differential signal resulting from the differential process. Since the first and second control signals are inverted with respect to each other, if the second control signal is active (e.g., high voltage level), the second signal processing sub-module 213 may perform a differential process between the analog signal and a predefined step voltage. Otherwise, if the second control signal is inactive (e.g., low voltage level), the second signal processing sub-module 213 may perform a differential process between the analog signal and the ground voltage, which is equivalent to directly outputting the reference voltage to the integration sub-module. The step voltage in the second signal processing sub-module may be the same as that in the first signal processing sub-module. As shown in FIG. 4 or FIG. 5, the second signal processing sub-module 213 may include a second switching sub-module and a second operation sub-module. In particular, a switching element in the second switching sub-module may choose between the step voltage $V_{FS}$ and the digital ground voltage under the control of the second control signal, and a subtractor in the second operation sub-module may perform a differential process between the reference voltage and $V_{FS}$ or the digital ground voltage, whichever is chosen by the second control signal, and output the second differential signal resulting from the differential process.

Since the first and second control signals are mutually inverted, if the first differential signal is obtained from a subtraction operation between the analog signal and the step voltage $V_{FS}$, then the second differential signal is a result of a subtraction operation between the predefined reference voltage and the digital ground voltage. Likewise, if the first differential signal is obtained from a subtraction operation between the analog signal and the digital ground voltage, then the second differential signal is a result of a subtraction operation between the predefined reference voltage and the step voltage $V_{FS}$. In this way, with the mutually inverted control signals, the first and second signal processing sub-module 212, 213 can apply disparate differential processes to rising and falling transitions of the voltage of the analog signal.

The integration sub-module 214 may be configured to receive any pair of first and second differential signals as described above from the first and second signal processing sub-modules and perform an integral process between the first and second differential signals. In particular, if the voltages of the two differential signals provided by the first and second signal processing sub-modules 212, 213 to the integration sub-module under the control of the corresponding control signals are respectively ($V_{CS}-V_{FS}$) and $V_{ref}$, the integration sub-module 214 may perform an integral process between ($V_{CS}-V_{FS}$) and $V_{ref}$. If the voltages of the two differential signals provided by the first and second signal processing sub-modules 212, 213 to the integration sub-module under the control of the corresponding control signals are respectively ($V_{ref}-V_{FS}$) and $V_{CS}$, the integration sub-module 214 may perform an integral process between ($V_{ref}-V_{FS}$) and $V_{CS}$. One or more integral signals may be output from each integral process of the integration sub-module 214.

In some embodiments, the integration sub-module 214 may include a dual-output integrator, in order to make the integral signals from the integration sub-module 214 more sensitively identifiable. The dual-output integrator may have non-inverting and inverting inputs for receiving the first and second differential signals, respectively. In response to a voltage comparison drawn between the received signals, high and low levels are present at non-inverting and inverting outputs of the dual-output integrator, which reflect an integration result for the analog signal over one unit interval. For example, as shown in FIG. 4, a first differential signal may be received at the non-inverting input of the dual-output integrator and a second differential signal at the inverting input thereof. If the first differential signal has a voltage higher than that of the second differential signal, a signal will be present at the inverting output of the dual-output integrator, which has a voltage lower than that of a signal simultaneously present at the non-inverting output thereof. Otherwise, if the voltage of the first differential signal is equal to or lower than that of the second differential signal, then a signal will be present at the inverting output of the dual-output integrator, which has a voltage higher than that of a signal simultaneously present at the non-inverting output thereof. The signals from the integration sub-module 214 represent integral signals in accordance with the analog signal and are fed to the comparison sub-module 215.

The comparison sub-module 215 may be configured to perform a comparison between the signals from the integration sub-module 214 and output a differential-integral signal based on the comparison. The comparison sub-module 215 may include a comparator, which outputs a result of the comparison with reference to the unit interval. The comparator may have non-inverting and inverting inputs for receiving the signals from the integration sub-module, respectively, and based on the voltage levels of the signals received at the non-inverting and inverting inputs, output a 1-bit digital signal. The 1-bit digital signal is the differential-integral signal resulting from the overall differential-integral process on the analog signal. Alternatively, the comparison sub-module may further include an inverter adapted to invert the 1-bit digital signal from the comparator and output the inverted 1-bit digital signal as the differential-integral signal. For example, as shown in FIG. 4 or FIG. 5, the comparator in the comparison sub-module may be implemented as a latching comparator having a non-converting input coupled to the inverting output of the integrator in the integration sub-module, and an inverting input coupled to the non-inverting output of the integrator. Additionally, the latching comparator may generate the 1-bit digital signals as pulse signals with reference to the unit interval. In FIG. 4, the 1-bit digital signal from the latching comparator is processed by the inverter into the 1-bit differential-integral signal SEL output by the differential-integral module. In order to achieve a simplified circuit structure, the comparison sub-module may share the same inverter with the control signal generation sub-module. In this case, the first and second control signals are provided at the input and output of this common inverter, respectively.

It is to be noted that the above-discussed coupling between the integration sub-module and the comparison sub-module with the two connections is merely exemplary, and should not be construed to limit the scope of the present application in any sense. Indeed, it is also possible to connect the non-converting input of the comparator to the non-inverting output of the integrator and connect the inverting input of the comparator to the inverting output of the integrator. In the latter case, corresponding adjustments may be additionally made in the downstream signal routing logic so that the same 1-bit differential-integral signal as in the example of FIG. 4 can be output. Further, those skilled in the art may utilize other analog or digital circuit components carry out the fully differential-integral processes from which the 1-bit differential-integral signals are output with reference to the unit interval.

The digital-to-analog conversion module is configured to accumulate a count of the differential-integral signals of the unit interval and thus convert the result of the counting operation into a filtered analog signal.

Figure 6:
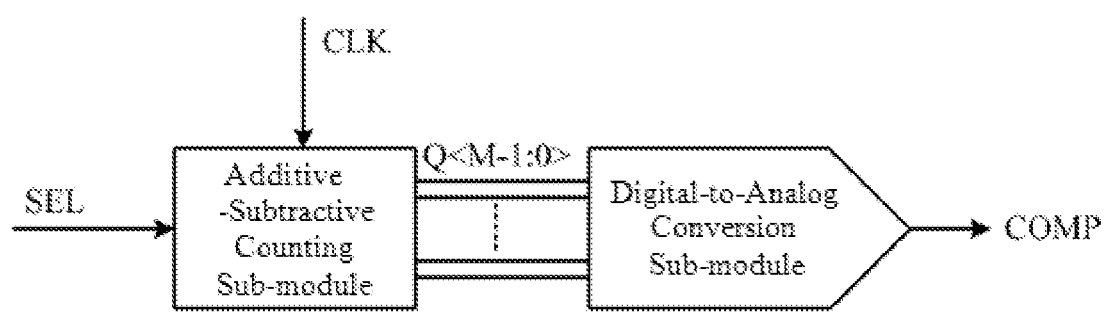
FIG. 6 shows a schematic diagram of a digital-to-analog conversion module in a low-pass filter according to an embodiment of the present application.

Reference is now made to FIG. 6, a schematic diagram of the digital-to-analog conversion module. The digital-to-analog conversion module may include an additive-subtractive counting sub-module and a digital-to-analog conversion sub-module. The additive-subtractive counting sub-module may receive 1-bit differential-integral signals and accumulate a count thereof. The additive-subtractive counting sub-module may produce M-bit outputs. During the counting process, the additive-subtractive counting sub-module may sample a differential-integral signal with reference to the unit interval. If the sampled differential-integral signal is of high voltage level, the additive-subtractive counting sub-module may perform an additive operation. If the sampled differential-integral signal is of low voltage level, the additive-subtractive counting sub-module may perform a subtractive operation. Each additive or subtractive operation may lead to an update of the count, which is output as an M-bit binary digital signal to the digital-to-analog conversion sub-module. The digital-to-analog conversion sub-module may generate a voltage signal from such received M-bit binary digital signals, as the low-pass filtered signal COMP.

As an example, operation of the differential-integral module in the $(n+1)^{th}$ unit interval will be explained with reference to a schematic circuit diagram of an embodiment of the low-pass filter shown in FIG. 7. When the differential-integral module outputs a high voltage level 1-bit differential-integral signal SEL in the $n^{th}$ unit interval, the first signal processing sub-module 212 performs a subtraction operation between the acquired analog signal and the digital ground voltage under the control of the inverted signal of SEL (low voltage level) and outputs the difference as a first differential signal. At the same time, the second signal processing sub-module 213 performs a subtraction operation between the predefined reference voltage and a step voltage $V_{FS}$ under the control of SEL (high voltage level) and outputs the difference as a second differential signal. The first and second differential signals are provided at the non-converting and inverting inputs of the integration sub-module 214, respectively, and then processed by the dual-output integrator in the integration sub-module 214. Responsively, if a voltage at the inverting output of the integration sub-module 214 is higher than a voltage at the non-inverting output thereof, a high-level signal will be generated from a comparison performed in the comparison sub-module 215, followed by outputting of a low-level differential-integral signal SEL from the inverter. Otherwise, if a voltage at the inverting output of the integration sub-module 214 is lower than a voltage at the non-inverting output thereof, a low-level signal will result from a comparison performed in the comparison sub-module 215, followed by outputting of a high-level signal differential-integral signal SEL from the inverter.

Assuming a low-level signal SEL is output from the $(n+1)^{th}$ unit interval, operation of the differential-integral module in the $(n+2)^{th}$ unit interval will be explained as an example. The first signal processing sub-module 212 performs a subtraction operation between the acquired analog signal and the step voltage $V_{FS}$ under the control of the inverted signal of SEL (high voltage level) and outputs the difference as a first differential signal. At the same time, the second signal processing sub-module 213 performs a subtraction operation between the predefined reference voltage and the digital ground voltage under the control of SEL (low voltage level) and outputs the difference as a second differential signal. The first and second differential signals are provided at the non-converting and inverting inputs of the integration sub-module 214, respectively, and then processed by the dual-output integrator in the integration sub-module 214. Responsively, if a voltage at the inverting output of the integration sub-module 214 is higher than a voltage at the non-inverting output thereof, a high-level signal will be generated from a comparison performed in the comparison sub-module, followed by outputting of a low-level differential-integral signal SEL from the inverter. Otherwise, if a voltage at the inverting output of the integration sub-module 214 is lower than a voltage at the non-inverting output thereof, a low-level signal will be generated from a comparison performed in the comparison sub-module 215, followed by outputting of a high-level signal differential-integral signal SEL from the inverter.

The additive-subtractive counting sub-module in the digital-to-analog conversion module may be configured to accumulate a count of received 1-bit differential-integral signals SEL. During each counting process, the additive-subtractive counting sub-module may sample a differential-integral signal of the unit interval. If the sampled differential-integral signal is a high-level signal, the additive-subtractive counting sub-module may perform an additive operation. If the sampled differential-integral signal is a low-level signal, the additive-subtractive counting sub-module may perform a subtractive operation. The digital-to-analog conversion sub-module may be configured to generate the low-pass filtered signal COMP from received M-bit binary digital signals.

The above-described fully differential-integral process and additive-subtractive counting process may be repeated so that the differential-integral module outputs 1-bit digital differential-integral signals. Over a period time of such fully differential-integral processing of the analog signal, if the difference between $V_{CS}$ and $V_{ref}$ is close to an upper bound, the number of "1" outputs from the comparator will be noticeably greater than the number of "0" outputs. Similarly, if the difference between $V_{CS}$ and $V_{ref}$ is close to a lower bound, then the number of "0" outputs from the comparator will be noticeably greater than the number of "1" outputs. Additionally, if $V_{CS}$ and $V_{ref}$ are nearly equal in magnitude, the number of "1" will be almost the same as that of "0". Reference is now made to FIG. 8, a schematic illustration of waveforms of signals input to and output from the low-pass filter of FIG. 7. In the figure, the input analog signal CS corresponds to the analog signal sampled from the load, and the signal COMP corresponds to the filtered signal resulting from the processing of the low-pass filter. Within the period from t1 to t2, the voltage of the analog signal CS is higher than the reference voltage $V_{ref}$. Among 1-bit differential-integral signals SEL resulting from fully differential-integral processes performed by the differential-integral module, there are much more low-level ones indicating $(V_{CS}-V_{FS})>V_{ref}$ than high-level ones indicating $(V_{ref}-V_{FS})>V_{CS}$. As a result, the signal COMP generated by the digital-to-analog conversion module gradually decreases. Within the period from t2 to t3, the voltage of the analog signal CS is equal to or lower than the reference voltage $V_{ref}$. Among 1-bit differential-integral signals SEL resulting from fully differential-integral processes performed by the differential-integral module, there are much more high-level ones indicating $(V_{ref}-V_{FS})>V_{CS}$ than low-level ones indicating $(V_{CS}-V_{FS})>V_{ref}$. As a result, the signal COMP produced by the digital-to-analog conversion module gradually increases. The resulting low-pass filtered signal COMP has a comparable waveform to a low-pass filtered signal produced by a low-pass filter design with a high-capacitance capacitor but a different phase therefrom.

Figure 7:
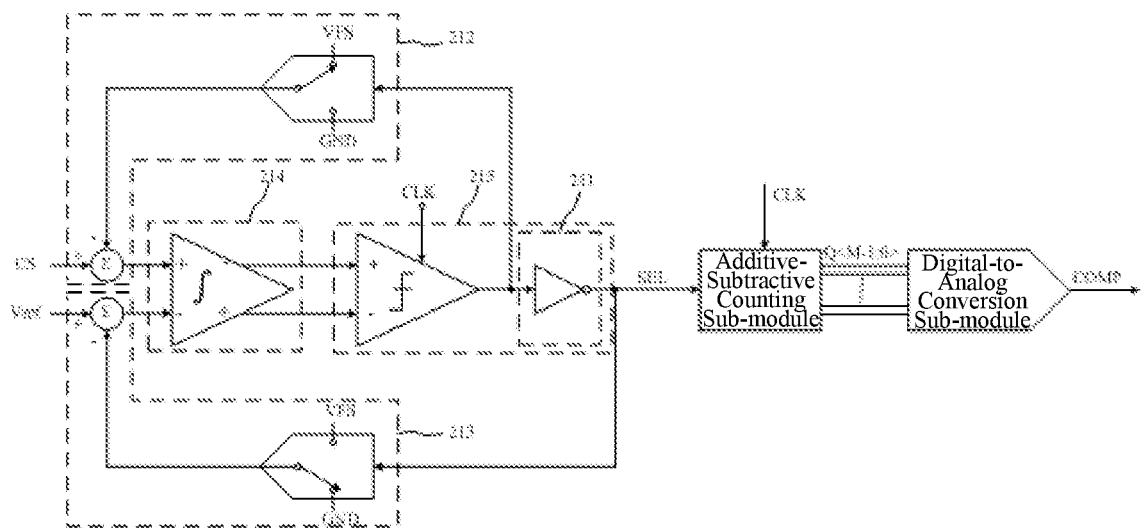
FIG. 7 shows a schematic diagram of the circuit of a low-pass filter according to the present application.
Figure 8:
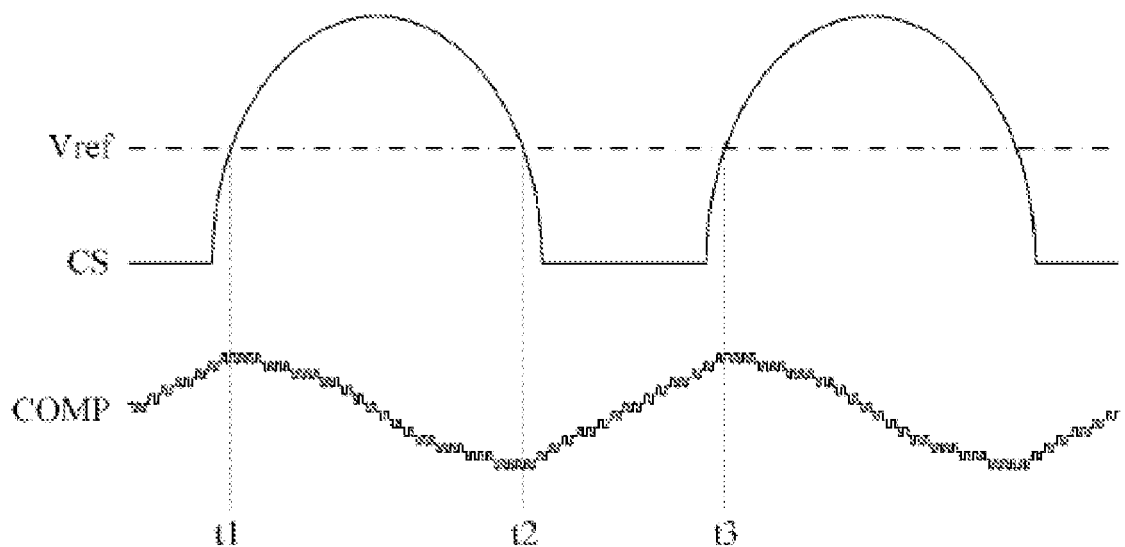
FIG. 8 schematically shows waveforms of signals input to and output from the low-pass filter of FIG. 7.

As can be seen from FIGS. 7 and 8, the circuit principle of the differential-integral module implies $V_{CS}-V_{ref}=(2 \cdot \hat{D}-1) \cdot V_{FS}$, where $\hat{D}$ represents an average proportion of high-level (or low-level) outputs from the comparison sub-module. Thus, by introducing $V_{FS}$, the 1-bit digital differential-integral signals from the differential-integral module indicate a relationship between the acquired analog signal and $V_{ref}$. In order to restore the low-pass filtered signal for the as an analog signal, the 1-bit differential-integral signals from the differential-integral module may be fed to the digital-to-analog conversion module.

In a driving system for a device intended for DC powering of a load, a low-pass filter is generally included to provide a filtered signal as a fed-back signal, an internal reference signal or the like. The present application also provides a switching control circuit for use in, for example, an LED light and a driving system thereof, as well as in other driving systems suitable to use the switching circuit to enable a stable power supply for a load. The switching control circuit is configured to control a switching circuit that controls a power bus to power a load.

Figure 9:
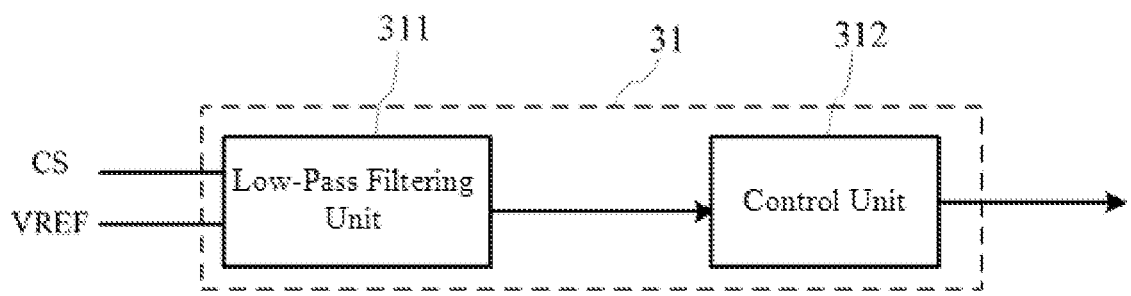
FIG. 9 shows a schematic diagram of a switching control circuit according to an embodiment of the present application.

Reference is now made to FIG. 9, a schematic diagram of an embodiment of the switching control circuit, the switching control circuit 31 includes a low-pass filtering unit 311 and a control unit 312.

The low-pass filtering unit 311 may be implemented as a low-pass filter as set forth in any of the foregoing embodiments, or any other low-pass filter constructed on the basis of the principles of the above embodiments. The low-pass filtering unit 311 is configured to, in response to an analog sample signal input from the load, output a filtered signal to the control unit 312.

Figure 10:
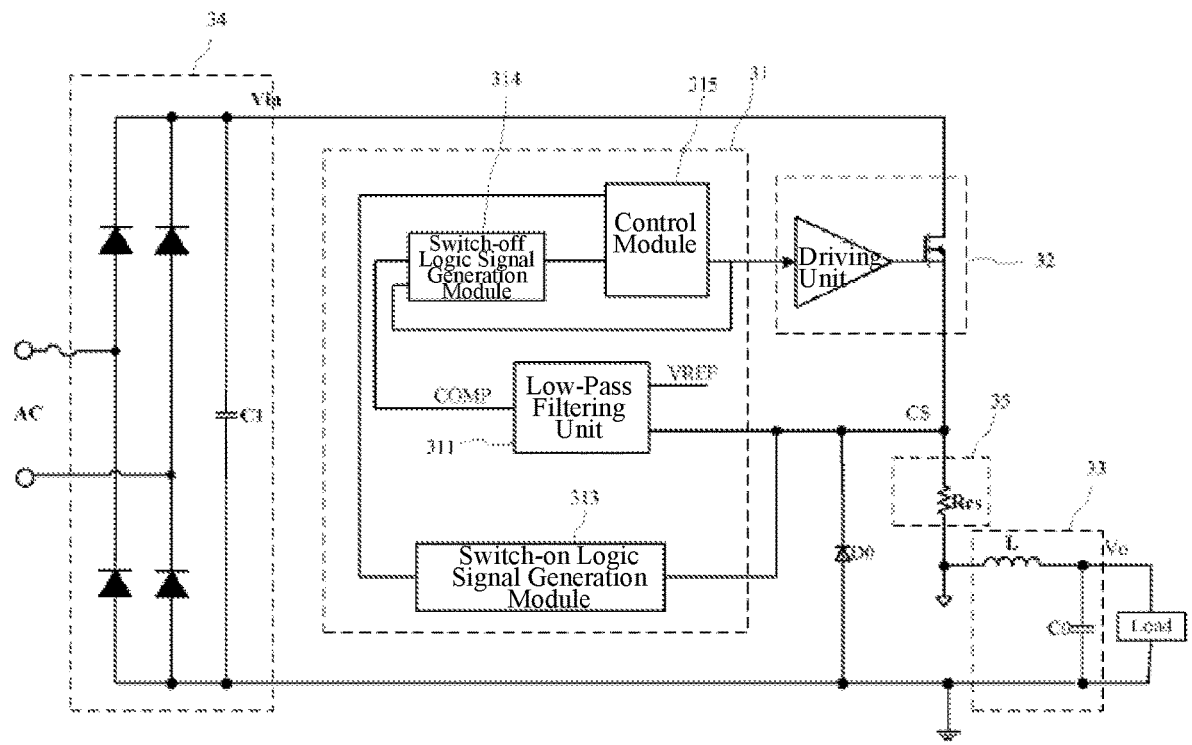
FIG. 10 shows a schematic circuit diagram of a driving system according to an embodiment of the present application.

Reference is now made to FIG. 10, a schematic circuit diagram of a driving system according to an embodiment. The analog sample signal may be obtained by a sampling unit 35 coupled to the switching control circuit. The sampling unit 35 may be arranged in a power supply line and configured to sample the analog sample signal CS relative to a digital ground voltage from the power supply line.

It is to be noted that the sampling unit is merely exemplary. Depending on the location of the switching circuit in the power supply line, the sampling unit may also be configured to sample an analog sample signal from another circuit segment in the power supply line.

The low-pass filtering unit 311 is based on the low-pass filter circuit structure as described above to digitalize differential-integral signals derived from both the voltage of the analog sample signal and a predefined reference voltage, accumulate a count of the differential-integral signals to convert them into a filtered analog signal, and transmit the analog filtered signal to the control unit 312.

The control unit 312 is configured to count down a switch-on time period of the switching circuit based on the analog filtered signal and indicate the switching circuit to be switched off upon expiry of the switch-on time period.

With a voltage $V_{COMP}$ of the received filtered signal as a threshold voltage, the control unit 312 may start a switch-on timer upon the switching circuit being switched on. The switch-on time may be represented by a voltage signal, and the control unit 312 indicates the switching circuit to be switched off upon the voltage signal reaching the threshold voltage $V_{COMP}$.

In some examples, as shown in FIG. 10, the control unit 312 may include a switch-off signal generation module 314 and a control module 315. The switch-off signal generation module 314 may be configured to receive the filtered signal and a fed-back switch-on signal for the switching circuit, start a timer once the switching circuit is switched on, and output a switch-off signal when it is determined based on the analog filtered signal that the switch-on timer has expired. The switch-off signal generation module may be coupled to an output of the control unit in order to receive a control signal indicating the switching circuit to be switched on or off High and low levels of the control signal may serve as switch-off and switch-on signals. Alternatively, the switch-off signal generation module 314 may be coupled to an output of a driving unit in the switching circuit, which is configured to output high and low levels as driving and non-driving signals. In this case, the switch-off signal generation module 314 may take the driving signal as a switch-on signal and the non-driving signal as a switch-off signal.

When the switch-off signal generation module 314 detects a transition edge from a switch-off signal toward a switch-on signal, it may start a timer for counting down a switch-on period and generate a voltage signal corresponding to the timer value. Upon the voltage signal reaching the voltage of the filtered signal, it may output a switch-off signal. To this end, the switch-off signal generation module 314 may include a timer circuit module and a comparator circuit module (both are not shown). When the timer circuit module receives a switch-on signal, it may start an internal timer and output, during the running of the timer, a voltage signal (e.g., a ramp signal or a step signal) corresponding to the timer value. For example, in order to enable the timer function, the timer circuit module may include a capacitor and a charge control sub-module. When receiving a switch-on signal, the charge control sub-module in the switch-off signal generation module may be controlled to cause the capacitor to be charged with a linear voltage versus time profile and output a voltage signal. The comparator circuit module may have an input for receiving the filtered signal and another input for receiving the voltage signal. Upon the voltage signal reaching the voltage of the filtered signal, the comparator circuit module may output a switch-off signal. For example, the comparator circuit module may compare the voltage of the filtered signal received at its inverting input with the voltage signal indicative of a charge state of the capacitor received at its non-converting input. Upon the voltage signal reaching the voltage of the filtered signal, the comparator circuit module may output a high level.

After the switching circuit is switched off, the switch-off signal generation module 314 may reset the switch-on timer. In some examples, the switch-off signal generation module 314 may reset the switch-on timer at the same time as the switch-off signal is output. In other examples, the switch-off signal generation module 314 may reset the switch-on timer based on a fed-back switch-off signal for the switching circuit. For example, a discharge control sub-module in the timer circuit module may cause discharge of the capacitor based on a switch-off signal or a switch-off signal.

It is to be noted that the above-described structure of the switch-off signal generation module is merely exemplary, and should not be construed to limit the scope of the present application in any sense. The switch-off signal generation module may implement the switch-on timer alternatively by a counter circuit module that counts the number of clock cycles, a digital-to-analog conversion circuit module, a comparator circuit module and a reset circuit module. In this case, upon receiving a switch-on signal, the counter circuit module may start counting the number of clock cycles of a clock signal, and the M-bit digital-to-analog conversion circuit module may convert the number of cycles into a corresponding voltage signal, followed by a comparison carried out between the voltage signal and the voltage of the filtered signal by the comparator circuit module. Upon the voltage signal reaching the voltage of the filtered signal, a switch-off signal may be output. When receiving the switch-off signal, the reset circuit module may reset the counter circuit module. Those skilled in the art will appreciate that the circuit structures operating the switch-on timer based on the filtered signal and outputting the switch-off signal are both considered as particular examples of the switch-off signal generation module.

The switch-off signal from the switch-off signal generation module 314 may be fed to the control module 315, which may be configured to cause the switching circuit to be switched off based on the switch-off signal. For example, as shown in FIG. 10, the switching circuit 32 may include a gate-driven switching element and the driving unit, and the control module 315 may include a flip-flop (not shown) having a reset terminal coupled to the switch-off signal generation module. When receiving the switch-off signal, the reset flip-flop may be caused to output a low level (i.e., the switch-off signal) to the switching circuit.

It is to be noted that the above-described method of outputting the switch-off signal from the control module 315 is merely exemplary, and should not be construed to limit the scope of the present application in any sense. Indeed, the control module 315 may output the switch-off signal depending on the voltage of an electrical signal as required by the switching element (e.g., a switching power transistor) in the switching circuit to fulfill the switch-off operation.

In the application in a driving system for, e.g., an LED light, in order to provide the LED light with a stable power supply, the driving system may include a power conversion circuit 35 and produce electromagnetic oscillations from current variations caused by switch-on and switch-off operations of the switching circuit. As shown in FIG. 7, in the control unit in the switching control circuit, a switch-on signal generation module 313 for indicating the switching circuit to be switched on may be further integrated.

The switch-on signal generation module 313 may be configured to detect a demagnetization process in the power conversion circuit 33 coupled to the switching circuit 32 and output a demagnetization signal indicating when the demagnetization process is finished.

In particular, the switch-on signal generation module 313 may determine whether demagnetization of an inductor in the power conversion circuit 33 has been completed through detecting an electrical signal representative of a current in the inductor and output a switch-on signal based on the demagnetization signal. The electrical signal detected by the switch-on signal generation module 313 may be either an analog sample signal acquired by the low-pass filtering unit 311 or an electrical signal obtained from the switching circuit 32.

To this end, the switch-on signal generation module 313 may include a demagnetization detection sub-module (not shown) configured to detect the demagnetization process in the power conversion circuit coupled to the switching circuit and generate the demagnetization signal. In particular, the demagnetization detection sub-module may determine the completion of the demagnetization process and generate the demagnetization signal (or deactivate the normally active demagnetization signal) when detecting a voltage valley of the electrical signal. The demagnetization signal may be output to the control module 315 as the switch-on signal.

The control module 315 may be configured to cause the switching circuit to be switched off or on based on a control logic of the switch-off and switch-on signals. For example, the control module 315 may include a flip-flop having a reset terminal for receiving the switch-off signal and a set terminal for receiving the switch-on signal. The switching circuit may be caused to be switched on when the switch-on signal is active, or caused to be switched off when the switch-off signal is active.

In some embodiments, in order to enable the power supply capabilities of the power conversion circuit to address the load's power supply need, the switch-on signal generation module 313 may start a delay timer at the same time as it detects the demagnetization signal or a certain period of time later and output the switch-on signal based on both the detected demagnetization signal and a delay indication signal. To this end, in addition to the demagnetization detection sub-module, the switch-on signal generation module may further include a switch-on delay sub-module and a switch-on signal generation sub-module (both are not shown).

The switch-on delay sub-module may be configured to start the delay timer based on the switch-off signal for the switching circuit and output the delay indication signal upon expiry of the delay timer. In particular, the switch-on delay sub-module may start the delay timer when receiving the switch-off signal, or when receiving both the switch-off signal and the demagnetization signal, and output the delay indication signal when the delay timer expires. Depending on the load's power supply need and the power conversion circuit's power supply capabilities, the duration of the delay timer may be either greater or smaller than the duration required for the demagnetization detection.

Similar to the circuit structure of the switch-off signal generation module, during the running of the delay timer, the switch-on delay sub-module may generate a voltage signal corresponding to the timer value, and output the delay indication signal when determining the expiry of the delay timer based on a predefined threshold voltage, a threshold voltage determined by a detected sample signal from the load or a threshold voltage determined by a conditioning signal from the previous circuit (e.g., a PWM signal).

Similar to the circuit structure of the switch-off signal generation module, the switch-on delay sub-module may reset the internal delay timer based on the generated delay indication signal or the fed-back switch-off signal.

The switch-on signal generation sub-module may be configured to output the switch-on signal based on a control logic of the received demagnetization signal and delay indication signal. In particular, the switch-on signal generation sub-module may include a set of logic elements grouped according to a predefined logic, and output the switch-on signal when detecting the demagnetization signal and delay indication signal to be both active. The logic elements may include, but are not limited to, at least one of AND gates, OR gates, NAND gates, NOT gates, encoders, decoders, selectors, latches, etc. or various combination thereof. For example, the switch-on signal generation sub-module may include an AND gate and a latch. The latch may output a latch signal based on the demagnetization signal, and the AND gate may receive both the latch signal from the latch and the delay indication signal and output a high level as the switch-on signal when both the latch signal and the delay indication signal are high-level signals.

The switch-on signal generated by the switch-on signal generation sub-module may be fed to the control module, so that the control module can cause the switching circuit to be switched off or on based on the control logic of the switch-off and switch-on signals.

With FIG. 10 as an example, the switching control circuit 31 is configured to control the switching circuit 32. In particular, the switching circuit 32 may be configured for current rectification of the power conversion circuit 33, which is helpful in providing the load with a stable power supply. The switching control circuit 31 includes the low-pass filtering unit 311 and the control unit. The low-pass filtering unit 311 may include a differential-integral module and a digital-to-analog conversion module. With combined reference to FIG. 4, the differential-integral module may include a control signal generation sub-module 211, a first signal processing sub-module 212, a second signal processing sub-module 213, an integration sub-module 214 and a comparison sub-module 215. Referring again to FIG. 7, the control unit may include the switch-off signal generation module 314, the switch-on signal generation module 313 and the control module 315.

The low-pass filtering unit 311 is configured to acquire an analog sample signal from a sampling unit 35 coupled between the load and a digital ground voltage. Referring to FIG. 7, with the differential-integral module in the low-pass filtering unit 311 (corresponding to the low-pass filter as described above in connection with FIG. 7) having output a high-level differential-integral signal SEL in the $n^{th}$ unit interval, in the $(n+1)^{th}$ unit interval, the control signal generation sub-module 211 provides the inverted signal of SEL (low voltage level) to the first signal processing sub-module 212, so that the first signal processing sub-module 212 performs a subtraction operation between the acquired analog signal and the digital ground voltage under the control of the inverted SEL and outputs the difference as a first differential signal. At the same time, the second signal processing sub-module 213 performs a subtraction operation between a predefined reference voltage and a step voltage $V_{FS}$ under the control of SEL (high level) and outputs the difference as a second differential signal. The first and second differential signals are provided at non-converting and inverting inputs of the integration sub-module, respectively, and processed by a dual-output integrator in the integration sub-module. If a voltage at an inverting output of the integration sub-module is higher than a voltage at a non-inverting output thereof, a high-level signal corresponding to the inverted version of the signal SEL will result from a comparison performed in the comparison sub-module, a low-level differential-integral signal SEL will be output from an inverter. Otherwise, if a voltage at an inverting output of the integration sub-module 214 is lower than a voltage at the non-inverting output, a low-level signal will result from a comparison performed in the comparison sub-module 215, and a high-level differential-integral signal SEL will be output from the inverter.

Assuming a low-level signal SEL is output from the $(n+1)^{th}$ unit interval, in the $(n+2)^{th}$ unit interval, the first signal processing sub-module 212 in the differential-integral module performs a subtraction operation between the acquired analog signal and the step voltage $V_{FS}$ under the control of the inverted version of SEL (high voltage level) and outputs the difference as a first differential signal. At the same time, the second signal processing sub-module 213 performs a subtraction operation between the predefined reference voltage and the digital ground voltage under the control of SEL (low voltage level) and outputs the difference as a second differential signal. The first and second differential signals are provided at the non-converting and inverting inputs of the integration sub-module 214, respectively, and then processed by the dual-output integrator in the integration sub-module 214. Responsively, if a voltage at the inverting output of the integration sub-module 214 is higher than a voltage at the non-inverting output thereof, a high-level signal will result from a comparison performed in the comparison sub-module 215, followed by outputting of a low-level differential-integral signal SEL from the inverter. Otherwise, if a voltage at the inverting output of the integration sub-module 214 is lower than a voltage at the non-inverting output thereof, a low-level signal will result from a comparison performed in the comparison sub-module 215, followed by outputting of a high-level signal differential-integral signal SEL from the inverter.

The above-described processes may be repeated so that 1-bit differential-integral signals SEL are output and fed to the digital-to-analog conversion module, and an additive-subtractive counting sub-module may accumulate a count of the signals SEL. Referring to FIG. 4, the additive-subtractive counting sub-module may produce M-bit outputs (M>1). During each counting process, the additive-subtractive counting sub-module may sample a 1-bit differential-integral signal (i.e., SEL) of the unit interval. If the sampled 1-bit differential-integral signal is a high-level signal, the additive-subtractive counting sub-module may perform an additive operation. If the sampled 1-bit differential-integral signal is a low-level signal, the additive-subtractive counting sub-module may perform a subtractive operation. Each additive or subtractive operation may lead to an update of the count, which is output as an M-bit binary digital signal to the digital-to-analog conversion sub-module. The digital-to-analog conversion sub-module may produce a voltage signal from such received M-bit binary digital signals, as a low-pass filtered signal COMP.

The low-pass filtering unit 311 may provide the signal COMP to the switch-off signal generation module 314 in the control unit, which may then start a switch-on timer based on a fed-back switch-on signal for the switching circuit 32 and generate a voltage signal RAMP corresponding to the value of the switch-on timer. It may further compare the voltage signal RAMP with the low-pass filtered signal COMP, and when the voltage signal RAMP reaches the voltage of the low-pass filtered signal COMP, output a switch-off signal. When detecting the switch-off signal, the control module 315 may cause the switching circuit 32 to be switched off.

During operation of the switching control circuit 31, the switch-on signal generation module 313 may be always monitoring the voltage of the analog sample signal, and determine that a demagnetization process in the power conversion circuit 33 has finished when the voltage of the analog sample signal drops to a predefined threshold value. When this occurs, it may output a demagnetization signal as a switch-on signal to the control module, so that the control module 315 may cause, based on the switch-on signal, the switching circuit 32 to be switched on.

Figure 11:
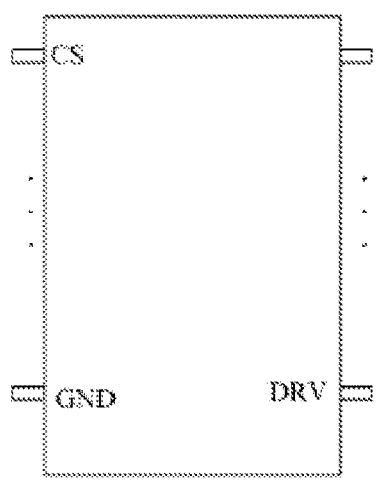
FIG. 11 schematically illustrates a packaged chip according to the present application.

The switching control circuit incorporating the low-pass filter as set forth in any of the foregoing embodiments may be integrated into a chip. Reference is now made to FIG. 11, a schematic illustration of the chip in a packaged configuration. The chip may have a plurality of pins, including: a first pin (CS) for acquiring an analog sample signal; a second pin (GND) configured to be grounded; a third pin (DRV) for outputting a control signal. When the switching control circuit is powered by an external constant-voltage power supply, the chip may additionally have a fourth pin (Vt) configured to be coupled to the constant voltage power supply. The first pin may be coupled to a sampling unit as illustrated in FIG. 10 and described above. The switching control circuit may be coupled to an input of the switching circuit via the third pin (DRV). For example, the switching control circuit may be coupled to a control terminal (e.g., an enable terminal) or an input terminal of the driving unit in the switching circuit via the third pin.

In some embodiments, the switching control circuit may be integrated with the driving unit in the switching circuit into a single chip. In this case, the driving unit may be configured to drive, under the control of the switching control circuit, a switching element arranged in a power supply line for a load. In addition, the driving unit may include a driver amplifier. As shown in FIG. 10, an electrical signal that has been amplified by the driver amplifier may be used to drive a gate electrode of a switching power transistor in the switching element so that a gate-drain voltage of the switching power transistor can reach a turn-on voltage of the switching power transistor. Accordingly, in addition to the above-described first, second and third pins, the chip incorporating the switching control circuit and the driving unit may further include at least a fourth pin configured to be coupled to an input of the switching element in order to output a driving signal.

In some other embodiments, the switching circuit may be integrated with a power control circuit into a single chip. That is, both the driving unit and the switching element in the switching circuit are integrated in the same chip. As can be seen from the above examples of coupling of the switching control circuit to the driving unit and the switching element, this chip may have pins, including the above first and second pins, as well as a fifth pin and a sixth pin for connecting the input and output of the switching element to a power bus, respectively.

It is to be noted that the switching element as set forth in any of the foregoing embodiments may further include any of a bipolar junction transistor (BJT), a junction-gate field-effect transistor (JFET), a depletion MOS power transistor and a TRIAC dimmer.

It is to be also noted that the chip may be further integrated therein with, among others, a clock signal generator for providing a clock signal to the switching control circuit, a constant voltage source for providing a reference voltage or the like to the switching control circuit.

For example, in an LED lighting device incorporating an LED light (i.e., a load), a rectifier circuit, the switching circuit, the power conversion circuit, the switching control circuit and other components, the switching control circuit alone, or the switching control circuit together with at least a part of the switching circuit may be integrated into a chip, which may be external connected by the pin as set forth in the above examples.

Figure 12:
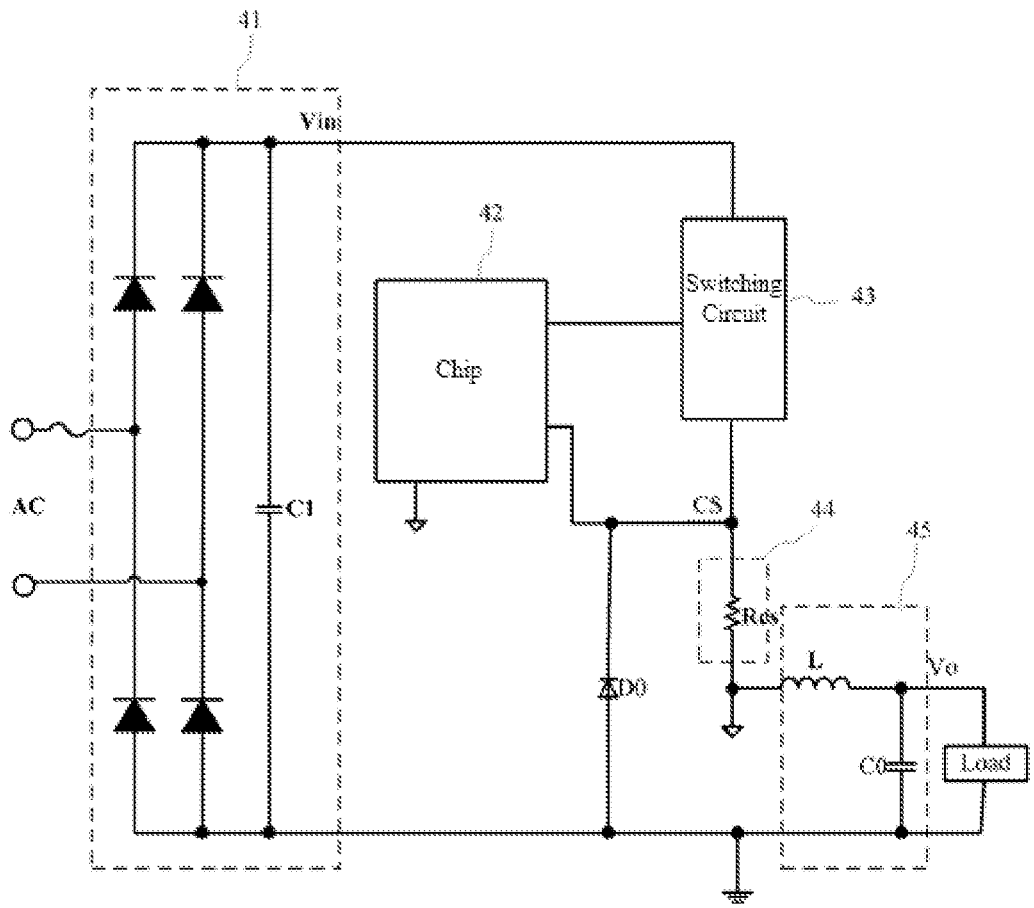
FIG. 12 shows a schematic diagram of a driving system according to the present application.

Accordingly, the present application also provides a driving system incorporating the switching control circuit as defined above. FIG. 12 shows a schematic diagram of this driving system. The driving system may be used to drive an LED light. The driving system may include a rectifier circuit 41, a switching circuit 43, a power conversion circuit 45 and a chip 42.

The rectifier circuit 41 may be configured to rectify the provided AC power and output it to a power bus. As shown in FIG. 12, the rectifier circuit 41 may include a diode bridge rectifier and a capacitor, which are configured to rectify the AC power into a half-sine wave and output it to the power bus. The power bus may be configured to power the operation of all the switching circuit 43, the power conversion circuit 45, the chip 42 and a driven load (e.g., an LED light).

The switching circuit 43 may be configured to switch on or off, under the control of the chip, a line circuit (i.e., a power supply line for the load) connected to the power bus. The switching circuit may include a driving unit and a switching element. The driving unit may include, for example, a driver amplifier having an input for receiving a driving control signal and an output coupled to the switching element. The switching element may include, for example, a switching power transistor having a gate electrode coupled to the output of the driver amplifier. A drain electrode and a source electrode of the switching power transistor may be both connected to the power bus. The switching element may further include any of a bipolar junction transistor (BJT), junction-gate field-effect transistor (JFET), a depletion MOS power transistor and a TRIAC dimmer.

As a result of switch-on and switch-off operations of the switching circuit 43, the power conversion circuit 45 in the line circuit may generate current oscillations, and the load may be powered based on such current oscillations. The power conversion circuit 45 may include, for example, an LC power conversion circuit.

The line circuit, in which the switching circuit and the power conversion circuit are arranged, may be provided with a sampling unit 44 for providing an analog sample signal. As shown in FIG. 12, the sampling unit 44 may be arranged between the switching circuit 43 and the power conversion circuit 45. The chip 42 may be coupled to the sampling unit 44 via the first pin CS. In some examples, the chip 42 may be configured to digitalize differential-integral signals derived from both a voltage of the analog sample signal and a predefined reference voltage and accumulate a count of the differential-integral signals to convert them into an analog filtered signal. The chip 42 may also be configured to, upon the switching circuit being switched on, start a timer for counting down a switch-on time period of the switching circuit based on the analog filtered signal, and upon expiry of the switch-on timer, cause the switching circuit 43 to be switched off. Additionally, the chip 42 may be configured to determine the completion of a demagnetization process in the power conversion circuit by monitoring the analog sample signal and, based on a detected demagnetization signal indicating the completion of the demagnetization signal, cause the switched-off switching circuit 43 to be switched on.

According to the above chip examples, the switching circuit in the driving system or the switching circuit may be integrated in the chip, thereby reducing the number of combinations of external electrical components.

Figure 13:
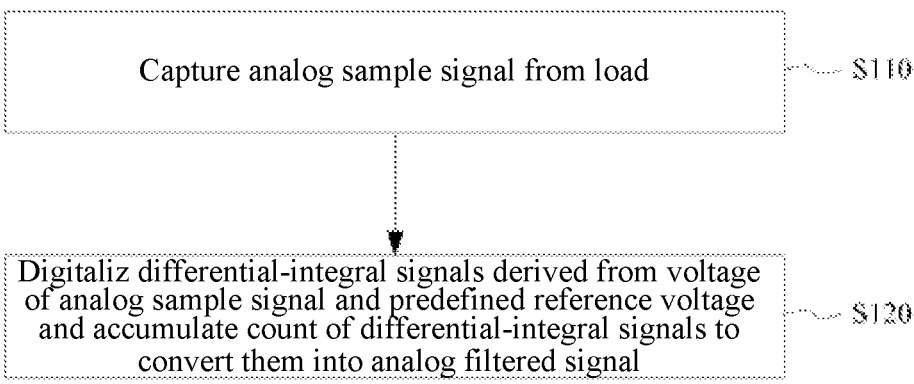
FIG. 13 shows a flowchart of a low-pass filtering method according to an embodiment of the present application.

Reference is now made to FIG. 13, a flowchart of a low-pass filtering method according to an embodiment of the present application. The low-pass filtering method can be implemented by the low-pass filter as set forth in any of the above embodiments or by any other low-pass filter suitable for implementing this method.

In step S110, an analog sample signal is acquired from a load. The analog sample signal may be acquired by a sampling unit coupled to a switching control circuit. For example, as shown in FIG. 7, the sampling unit 35 may be arranged in a power supply line for the load, and the analog sample signal CS may be acquired from the power supply line relative to a digital ground voltage. The switching control circuit 31 may be coupled to the sampling unit to obtain the analog sample signal CS.

In step S120, differential-integral signals derived from both a voltage of the analog sample signal and a predefined reference voltage are digitalized, and a count of the differential-integral signals is accumulated, thereby converting the differential-integral signals into an analog filtered signal.

A low-pass filtering unit in the switching control circuit may perform the differential-integral processes on the acquired analog signal on the basis of a unit interval derived from a clock signal, and the resulting differential-integral signals may be in the form of high/low voltage levels and vary with the analog sample signal on the basis of the unit interval. The unit interval may span one or N cycles of the clock signal, where N>1. In order to be compatible with circuit components in proceeding and succeeding stages, the output signal from the low-pass filter must be an electrical signal that can be processed by the circuit components. To this end, the low-pass filter may accumulate a count of the analog signals from the differential-integral processes to obtain the filtered signal that varies on the basis of the unit interval. The filtered signal is an electrical signal reflecting the acquired analog signal that has experienced the low-pass filtering process. Depending on the practical circuit design requirements, a frequency of the clock signal, some internal reference voltages (e.g., step voltages, voltage amplitudes) and analog and digital components may be selected for the low-pass filter. Depending on the signal processing method, the low-pass filter may be a first-order low-pass filter, a second-order low-pass filter, or the like.

In some embodiments, given the fact that both of a rectified AC power waveform of the DC-driving circuit device and a waveform of the load driven by the circuit device feature periodic half-sine envelopes, step S120 may include low-pass filtering the acquired analog signal in a fully differential-integral manner, as described in greater detail below.

In step S121, fully differential-integral processes are performed between the voltage of the analog sample signal and the predefined reference voltage based on respective differential-integral signals fed back on the basis of the unit interval, and 1-bit differential-integral signals are output.

Since a waveform with half-sine envelopes contains both monotonically rising and falling portions, the low-pass filtering unit may be configured with a differential-integral process between ($V_{CS} \pm V_{FS}$) and a reference voltage $V_{ref}$. To realize the differential-integral process, the differential-integral module is configured with a circuit structure for performing a differential process selected from between the analog sample signal and a step voltage, or between the reference voltage and the step voltage, depending on a differential-integral signal of the previous unit interval. Furthermore, the differential-integral module is configured with another circuit structure for performing an integral process on two signals from the differential process and thus obtaining a 1-bit digital differential-integral signal of the current unit interval, which is described by a high/low voltage level. Here, $V_{CS}$ denotes the voltage of the acquired analog signal, and $V_{FS}$ represents the step voltage, which may be provided either by an internal reference voltage, or by the high voltage level of the differential-integral signal.

The 1-bit differential-integral signal from the differential-integral module describes, in the form of the high/low voltage level, a transition of the voltage of the acquired analog signal relative to the reference voltage after the differential-integral process. For example, the output of the differential-integral module may be low voltage level when ($V_{CS} - V_{FS}$)>$V_{ref}$, and the output of the differential-integral module may be high when ($V_{CS} + V_{FS}$)<$V_{ref}$. It is to be noted that the transition of the voltage of the analog signal relative to the reference voltage, which is represented in the form of the high/low voltage level of the 1-bit differential-integral signal from the differential-integral module, may depend on the internal circuit structures of the differential-integral module and of the digital-to-analog conversion module connected to the differential-integral module, rather than being limited to waveforms defined by differential-integral signals presented in various exemplary embodiments of the present application.

Since the high/low voltage level of differential-integral signal depends on, among others, the circuit components used and the internal reference voltage, in order to enable accurate response of some circuit components of the differential-integral module to the fed-back differential-integral signal, as shown in FIG. 3, the low-pass filtering unit may include a first signal processing sub-module 212, a second signal processing sub-module 213, an integration sub-module 214 and a comparison sub-module 215. The first and second signal processing sub-module 212, 213 may together provide a feedback mechanism for the integration sub-module 214. The first and second signal processing sub-module 212, 213 may be individually configured to perform a full differential process between the voltage of the analog signal and the reference voltage based on the fed-back differential-integral signal so that the integration sub-module 214 and the comparison sub-module 215 can perform an integral process and output the 1-bit differential-integral signal. Such 1-bit differential-integral signals define a waveform in relation to the circuit structure of the digital-to-analog conversion module. In this way, the digital-to-analog conversion module can convert the 1-bit differential-integral signals into a low-pass filtered signal COMP describing the analog signal CS.

In order to enable integration between the voltage of the analog signal and the reference voltage $V_{ref}$, the first and second signal processing sub-modules may be provided to inversely select a step voltage or a ground voltage in response to a differential-integral signal. To this end, the first signal processing sub-module may include a first switching sub-module and a first operation sub-module. The first switching sub-module may be configured to selectively output a predefined step voltage or a digital ground voltage under the control of a fed-back differential-integral signal. The first operation sub-module may be configured to receive the analog sample signal from the load and perform a differential process between the output voltage from the first switching sub-module and the voltage of the analog signal. The second signal processing sub-module may include a second switching sub-module and a second operation sub-module. The second switching sub-module may be configured to selectively output a predefined step voltage or the digital ground voltage under the control of a fed-back differential-integral signal. The second operation sub-module may be configured to perform a differential process between the output voltage from the second switching sub-module and the predefined reference voltage.

Each of the first and second operation sub-modules may include a subtractor for performing a voltage-based differential operation. The first and second switching sub-modules may include structurally mirrored sets of switching elements. Alternatively, the two switching sub-modules may include structurally identical sets of switching elements, with either of them including an inverter for inverting a fed-back differential-integral signal. In this way, the two switching sub-modules are under the control of respective control signals which are inverted with respect to each other.

For example, for a high-level fed-back differential-integral signal, the first switching sub-module may choose to output a step voltage $V_{FS}$ in response to the high level of the fed-back signal, the first operation sub-module may perform a differential process between the reference voltage $V_{ref}$ and the step voltage $V_{FS}$. At the same time, the second switching sub-module may choose to output the digital ground voltage in response to the high level of the fed-back signal, the second operation sub-module may perform a differential process between the reference voltage $V_{ref}$ and the digital ground voltage. On the contrary, for a low-level fed-back differential-integral signal, the first switching sub-module may choose to output the digital ground voltage in response to the low level of the fed-back signal, the first operation sub-module may perform a differential process between the reference voltage $V_{ref}$ and the digital ground voltage. Simultaneously, the second switching sub-module may choose to output a step voltage $V_{FS}$ in response to the low level of the fed-back signal, the second operation sub-module may perform a differential process between the reference voltage $V_{ref}$ and the step voltage $V_{FS}$.

In some embodiments, the differential-integral module may additionally include a control signal generation sub-module. Reference is now made to FIG. 16, a schematic diagram of another embodiment of the differential-integral module. The control signal generation sub-module may be configured to generate, from a 1-bit differential-integral signal, a first control signal and a second control signal that is inverted with respect to the first control signal. In this case, the first signal processing sub-module may perform a differential process between the voltage of the analog sample signal and a predefined step voltage under the control of the first control signal, while the second signal processing sub-module may perform a differential process between the predefined reference voltage and a step voltage under the control of the differential-integral signal of the first control signal and thereby output a second differential signal.

It is to be noted that, constrained by the logical relations between signals in the circuit structures of the control signal generation sub-module, the first signal processing sub-module, the second signal processing sub-module, the integration sub-module, the comparison sub-module and the digital-to-analog conversion module, a 1-bit differential-integral signal as described herein is considered to be able to be inverted or otherwise processed, and the inverted version thereof is considered to be able to indicate a transition of the voltage of the analog signal with respect to the reference voltage. Those skilled in the art may make adjustments about the phase of such 1-bit differential-integral signals or the circuit structure of the digital-to-analog conversion module to convert the 1-bit differential-integral signals into the low-pass filtered signal COMP describing the analog signal CS.

The control signal generation sub-module may be configured to generate, from a 1-bit differential-integral signal, mutually inverted first and second control signals, which are then fed back to the upstream first and second signal processing sub-modules, respectively. For example, as shown in FIG. 4, the control signal generation sub-module 211 may include an inverter and use signals respectively at input and output of the inverter as the first and second control signals. In this case, the first control signal may be output to the first signal processing sub-module 212 and the second control signal to the second signal processing sub-module 213. In another example, as shown in FIG. 5, the control signal generation sub-module 211 may be arranged in the same circuit branch as the second signal processing sub-module. In this case, the first signal processing sub-module 212 may receive a differential-integral signal, as the first control signal, from an output of a comparator, and the second signal processing sub-module 213 may receive an inverted differential-integral signal from an inverter as the second control signal.

The first signal processing sub-module 212 may be configured to perform a differential process between the voltage of the analog signal and a predefined step voltage under the control of the first control signal and output a first differential signal resulting from the differential process. Here, if the first control signal is active (e.g., high level), the first signal processing sub-module 212 may perform a differential process between the analog signal and the predefined step voltage. Otherwise, if the first control signal is inactive (e.g., low level), the first signal processing sub-module 212 may perform a differential process between the analog signal and a ground voltage, which is equivalent to directly outputting the analog signal to the integration sub-module. The step voltage may be provided either by an internal reference voltage or by the active voltage level of the first control signal. As shown in FIG. 4 or 5, the first signal processing sub-module 212 may include a first switching sub-module and a first operation sub-module. In particular, the first switching sub-module may include a switching element, which is controlled by the first control signal to choose between a step voltage $V_{FS}$ provided by a reference voltage and the digital ground voltage. After that, a subtractor in the first operation sub-module may perform a differential process between the acquired analog signal and $V_{FS}$ or the digital ground voltage, whichever is chosen by the first control signal, and output a first differential signal resulting from the differential process.

Similar to the first signal processing sub-module 212, the second signal processing sub-module 213 may be configured to perform a differential process between the predefined reference and a step voltage under the control of the second control signal and output a second differential signal resulting from the differential process. Since the first and second control signals are inverted with respect to each other, if the second control signal is active (e.g., high level), the second signal processing sub-module 213 may perform a differential process between the analog signal and the predefined step voltage. Otherwise, if the second control signal is inactive (e.g., low level), the second signal processing sub-module 213 may perform a differential process between the analog signal and the ground voltage, which is equivalent to directly outputting the reference voltage to the integration sub-module. The step voltage in the second signal processing sub-module may be the same as that in the first signal processing sub-module. As shown in FIG. 4 or FIG. 5, the second signal processing sub-module 213 may include a second switching sub-module and a second operation sub-module. In particular, a switching element in the second switching sub-module may choose between the step voltage $V_{FS}$ and the digital ground voltage under the control of the second control signal, and a subtractor in the second operation sub-module may perform a differential process between the reference voltage and $V_{FS}$ or the digital ground voltage, whichever is chosen by the second control signal, and output a second differential signal resulting from the differential process.

Since the first and second control signals are mutually inverted, if the first differential signal is obtained from a subtraction operation between the analog signal and the step voltage $V_{FS}$, then the second differential signal is a result of a subtraction operation between the predefined reference voltage and the digital ground voltage. Likewise, if the first differential signal is obtained from a subtraction operation between the analog signal and the digital ground voltage, then the second differential signal is a result of a subtraction operation between the predefined reference voltage and the step voltage $V_{FS}$. In this way, with the mutually inverted control signals, the first and second signal processing sub-module 212, 213 can apply distinct differential processes to rising and falling transitions of the voltage of the analog signal.

The integration sub-module 214 in the low-pass filtering unit may be configured to receive any pair of first and second differential signals from the first and second signal processing sub-modules and perform an integral process between the first and second differential signals. In particular, if the voltages of the two differential signals provided by the first and second signal processing sub-modules 212, 213 to the integration sub-module under the control of the corresponding control signals are respectively ($V_{CS}-V_{FS}$) and $V_{ref}$, the integration sub-module 214 may perform an integral process between ($V_{CS}-V_{FS}$) and $V_{ref}$. If the voltages of the two differential signals provided by the first and second signal processing sub-modules 212, 213 to the integration sub-module under the control of the corresponding control signals are respectively ($V_{ref}-V_{FS}$) and $V_{CS}$, the integration sub-module 214 may perform an integral process between ($V_{ref}$-$V_{FS}$) and $V_{CS}$. One or more integral signals may be output from each integral process of the integration sub-module 214.

In some embodiments, the integration sub-module 214 may include a dual-output integrator, in order to make the integral signals from the integration sub-module 214 more sensitively identifiable. The dual-output integrator may have non-inverting and inverting inputs for receiving the first and second differential signals, respectively. In response to a voltage comparison drawn between the received signals, high and low levels are present at non-inverting and inverting outputs of the dual-output integrator, which reflect an integration result for the analog signal over one unit interval. For example, as shown in FIG. 4 or FIG. 5, a first differential signal may be received at the non-inverting input of the dual-output integrator and a second differential signal at the inverting input thereof. If the first differential signal has a voltage higher than that of the second differential signal, a signal will be present at the inverting output of the dual-output integrator, which has a voltage lower than that of a signal simultaneously present at the non-inverting output thereof. Otherwise, if the voltage of the first differential signal is equal to or lower than that of the second differential signal, then a signal will be present at the inverting output of the dual-output integrator, which has a voltage higher than that of a signal simultaneously present at the non-inverting output thereof. The high- and low-level signals from the integration sub-module 214 represent integral signals for the analog signal and are fed to the comparison sub-module 215.

The comparison sub-module 215 may be configured to perform a comparison between the signals from the integration sub-module 214 and output a differential-integral signal based on the comparison. The comparison sub-module 215 may include a comparator, which outputs a result of the comparison on the basis of the unit interval. The comparator may have non-inverting and inverting inputs for receiving the high- and low-level signals from the integration sub-module, respectively, and based on the voltages of the high- and low-level signals received at the non-inverting and inverting inputs, output a 1-bit digital signal. The 1-bit digital signal is the differential-integral signal resulting from the overall differential-integral process on the analog signal. Alternatively, the comparison sub-module may further include an inverter adapted to invert the 1-bit digital signal from the comparator and output the inverted 1-bit digital signal as the 1-bit differential-integral signal. For example, as shown in FIG. 4 or 5, the comparator in the comparison sub-module may be implemented as a latching comparator having a non-converting input, which is coupled to the inverting output of the integrator in the integration sub-module, and an inverting input coupled to the non-inverting output of the integrator. Additionally, the latching comparator may control the outputting of the 1-bit digital signals based on pulse signals occurring on the basis of the unit interval. In FIG. 4 or FIG. 5, the 1-bit digital signal from the latching comparator is processed by the inverter into the 1-bit differential-integral signal SEL output by the differential-integral module. In order to achieve a simplified circuit structure, the comparison sub-module may share the same inverter with the control signal generation sub-module.

It is to be noted that the above-discussed coupling between the integration sub-module and the comparison sub-module with the two signal connections is merely exemplary, and should not be construed to limit the scope of the present application in any sense. Indeed, it is also possible to connect the non-converting input of the comparator to the non-inverting output of the integrator and connect the inverting input of the comparator to the inverting output of the integrator. In the latter case, corresponding adjustments may be additionally made in the downstream signal routing logic so that the same 1-bit differential-integral signal as in the example of FIG. 3 can be output. Further, those skilled in the art may utilize other analog or digital circuit components under the control of pulse signals occurring on the basis of the unit interval to carry out the fully differential-integral processes from which the 1-bit differential-integral signals are output, a further description of which is omitted herein.

In step S122, a count of the differential-integral signals is accumulated on the basis of the unit interval, thereby converting them into the analog filtered signal.

As shown in FIG. 6, the digital-to-analog conversion module in the low-pass filtering unit may include an additive-subtractive counting sub-module and a digital-to-analog conversion sub-module. The additive-subtractive counting sub-module may receive 1-bit differential-integral signals and accumulate a count thereof. The additive-subtractive counting sub-module may produce M-bit outputs. During each counting process, the additive-subtractive counting sub-module may sample a differential-integral signal of the unit interval. If the sampled differential-integral signal is a high-level one, the additive-subtractive counting sub-module may perform an additive operation. If the sampled differential-integral signal is a low-level signal, the additive-subtractive counting sub-module may perform a subtractive operation. Each additive or subtractive operation may lead to an update of the count, which is output as an M-bit binary digital signal to the digital-to-analog conversion sub-module. The digital-to-analog conversion sub-module may produce a voltage signal from such received M-bit binary digital signals, as the low-pass filtered signal COMP.

Operation of the differential-integral module in the $(n+1)^{th}$ unit interval will be explained as an example with reference to FIG. 7, a schematic circuit diagram of an embodiment of the low-pass filter. When the differential-integral module outputs a high-level 1-bit differential-integral signal SEL in the $n^{th}$ unit interval, the first signal processing sub-module 212 performs a subtraction operation between the acquired analog signal and the digital ground voltage under the control of the inverted version of SEL (low level) and outputs the difference as a first differential signal. At the same time, the second signal processing sub-module 213 performs a subtraction operation between the predefined reference voltage and a step voltage $V_{FS}$ under the control of SEL (high level) and outputs the difference as a second differential signal. The first and second differential signals are provided at the non-converting and inverting inputs of the integration sub-module 214, respectively, and then processed by the dual-output integrator in the integration sub-module 214. Responsively, if a voltage at the inverting output of the integration sub-module 214 is higher than a voltage at the non-inverting output thereof, a high-level signal corresponding to the inverted version of SEL will result from a comparison performed in the comparison sub-module 215, followed by outputting of a low-level differential-integral signal SEL from the inverter. Otherwise, if a voltage at the inverting output of the integration sub-module 214 is lower than a voltage at the non-inverting output thereof, a low-level signal will result from a comparison performed in the comparison sub-module 215, followed by outputting of a high-level signal differential-integral signal SEL from the inverter.

Assuming a low-level signal SEL is output from the (n+1)-th unit interval, operation of the differential-integral module in the (n+2)-th unit interval will be explained as an example. The first signal processing sub-module 212 performs a subtraction operation between the acquired analog signal and the step voltage $V_{FS}$ under the control of the inverted version of SEL (high level) and outputs the difference as a first differential signal. At the same time, the second signal processing sub-module 213 performs a subtraction operation between the predefined reference voltage and the digital ground voltage under the control of SEL (low level) and outputs the difference as a second differential signal. The first and second differential signals are provided at the non-converting and inverting inputs of the integration sub-module 214, respectively, and then processed by the dual-output integrator in the integration sub-module 214. Responsively, if a voltage at the inverting output of the integration sub-module 214 is higher than a voltage at the non-inverting output thereof, a high-level signal corresponding to the inverted version of SEL will result from a comparison performed in the comparison sub-module, followed by outputting of a low-level differential-integral signal SEL from the inverter. Otherwise, if a voltage at the inverting output of the integration sub-module 214 is lower than a voltage at the non-inverting output thereof, a low-level signal will result from a comparison performed in the comparison sub-module 215, followed by outputting of a high-level signal differential-integral signal SEL from the inverter.

The additive-subtractive counting sub-module in the digital-to-analog conversion module may be configured to accumulate a count of received 1-bit differential-integral signals SEL. During each counting process, the additive-subtractive counting sub-module may sample a differential-integral signal on the basis of the unit interval. If the sampled differential-integral signal is a high-level signal, the additive-subtractive counting sub-module may perform an additive operation. If the sampled differential-integral signal is a low-level signal, the additive-subtractive counting sub-module may perform a subtractive operation. The digital-to-analog conversion sub-module may be configured to produce the low-pass filtered signal COMP from received M-bit binary digital signals.

The above-described fully differential-integral process and additive-subtractive counting process may be repeated so that the differential-integral module outputs 1-bit digital differential-integral signals. Over a period time of such fully differential-integral processing of the analog signal, if the difference between $V_{CS}$ and $V_{ref}$ is close to an upper bound, the number of "1" outputs from the comparator will be noticeably greater than the number of "0" outputs. Similarly, if the difference between $V_{CS}$ and $V_{ref}$ is close to a lower bound, then the number of "0" outputs from the comparator will be noticeably greater than the number of "1" outputs. Additionally, if $V_{CS}$ and $V_{ref}$ are nearly equal in magnitude, the number of "1's" will be almost the same as that of "0's". Reference is now made to FIG. 8, a schematic illustration of waveforms of signals input to and output from the low-pass filter of FIG. 7. In the figure, the input analog signal CS corresponds to the analog signal sampled by the low-pass filter from the load, and the signal COMP corresponds to the filtered signal resulting from the processing of the low-pass filter. Within the period from t1 to t2, in which the voltage of the analog signal CS is higher than the reference voltage $V_{ref}$, among 1-bit differential-integral signals SEL resulting from fully differential-integral processes performed by the differential-integral module, there are much more low-level ones indicating ($V_{CS}-V_{FS}$)>$V_{ref}$ than high-level ones indicating ($V_{ref}-V_{FS}$)>$V_{CS}$. As a result, the signal COMP produced by the digital-to-analog conversion module from count values from additive-subtractive counting processes gradually decreases. Within the period from t2 to t3, in which the voltage of the analog signal CS is equal to or lower than the reference voltage $V_{ref}$, among 1-bit differential-integral signals SEL resulting from fully differential-integral processes performed by the differential-integral module, there are much more high-level ones indicating ($V_{ref}-V_{FS}$)>$V_{CS}$ than low-level ones indicating ($V_{CS}-V_{FS}$) >$V_{ref}$. As a result, the signal COMP produced by the digital-to-analog conversion module from count values from additive-subtractive counting processes gradually increases. The resulting low-pass filtered signal COMP has a comparable waveform to a low-pass filtered signal produced by a low-pass filter design with a high-capacitance capacitor but a different phase therefrom.

As can be seen from FIGS. 7 and 8, the circuit principle of the differential-integral module implies $V_{CS}-V_{ref}(2\cdot\hat{D}-1)\cdot V_{FS}$, where $\hat{D}$ represents an average proportion of high-level (or low-level) outputs from the comparison sub-module. Thus, with $V_{FS}$, the 1-bit digital differential-integral signals from the differential-integral module indicate a relative relationship between the acquired analog signal and $V_{ref}$. In order to recover the low-pass filtered signal for the analog signal CS, the 1-bit differential-integral signals from the differential-integral module may be provided to the digital-to-analog conversion module.

Figure 14:
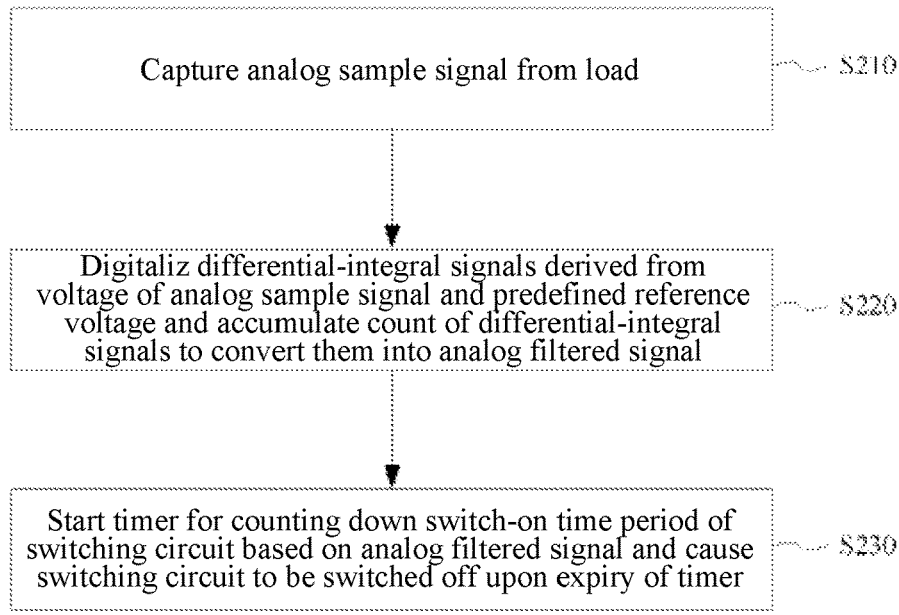
FIG. 14 shows a flowchart of a switching control method according to an embodiment of the present application.

Reference is now made to FIG. 14, a flowchart of a switching control method according to an embodiment of the present application. The switching control method can be implemented by the above-described switching control circuit or by any other switching control circuit suitable for implementing this method.

The switching control method is used to control a switching circuit for controlling powering of a load by a power bus.

Steps S210 to S220 in the method may be performed by the low-pass filtering unit in the switching control circuit. Since steps S210 to S220 are identical or similar to steps S110 to S120 of FIG. 13, a repeated description of them can be dispensed with. After a low-pass filtered signal COMP is obtained from steps S210 to S220, the switching control circuit further performs step S230.

In step S230, a timer for counting down switch-on time period of the switching circuit is started based on the analog filtered signal, and the switching circuit is caused to be switched off upon expiry of the timer.

With a voltage $V_{COMP}$ of the received filtered signal as a threshold voltage, the control unit 312 may start a switch-on timer upon the switching circuit being switched on. The switch-on time may be represented by a voltage signal, and the control unit 312 indicates the switching circuit to be switched off upon the voltage signal reaching the threshold voltage $V_{COMP}$.

In some examples, as shown in FIG. 10, the switch-off signal generation module 314 in the control unit is configured to receive the filtered signal and a fed-back switch-on signal for the switching circuit 32, start a timer once the switching circuit 32 is switched on, and output a switch-off signal when it is determined based on the analog filtered signal that the switch-on timer has expired. The switch-off signal generation module 314 may be coupled to an output of the control unit in order to receive a control signal for indicating the switching circuit to be switched on or off High and low levels of the control signal may serve as switch-off and switch-on signals. Alternatively, the switch-off signal generation module 314 may be coupled to an output of a driving unit in the switching circuit 32, which is configured to output high and low levels as driving and non-driving signals. In this case, the switch-off signal generation module 314 may take the driving signal as a switch-on signal and the non-driving signal as a switch-off signal.

When the switch-off signal generation module 314 detects a transition edge from a switch-off signal toward a switch-on signal, it may start a timer for counting down a switch-on period and generate a voltage signal corresponding to the timer value. Upon the voltage signal reaching the voltage of the filtered signal, it may output a switch-off signal. To this end, the switch-off signal generation module 314 may include a timer circuit module and a comparator circuit module. When the timer circuit module receives a switch-on signal, it may start an internal timer and output, during the running of the timer, a voltage signal (e.g., a ramp signal or a step signal) corresponding to the timer value. For example, in order to enable the timer function, the timer circuit module may include a capacitor and a charge control sub-module. When receiving a switch-on signal, the charge control sub-module in the switch-off signal generation module may be controlled to cause the capacitor to be charged with a linear voltage versus time profile and output a voltage signal. The comparator circuit module may have an input for receiving the filtered signal and another input for receiving the voltage signal. Upon the voltage signal reaching the voltage of the filtered signal, the comparator circuit module may output a switch-off signal. For example, the comparator circuit module may compare the voltage of the filtered signal received at its inverting input with the voltage signal indicative of a charge state of the capacitor received at its non-converting input. Upon the voltage signal reaching the voltage of the filtered signal, the comparator circuit module may output a high level.

In response to the outputting of the switch-off signal, the switching circuit to may be caused to be switched off. In some examples, the switch-off signal generation module 314 may reset the switch-on timer at the same time as the switch-off signal is output. In other examples, the switch-off signal generation module 314 may reset the switch-on timer based on a fed-back switch-off signal for the switching circuit. For example, a discharge control sub-module in the timer circuit module may cause discharge of a capacitor based on a switch-off signal or a switch-off signal.

It is to be noted that the above-described structure of the switch-off signal generation module is merely exemplary, and should not be construed to limit the scope of the present application in any sense. The switch-off signal generation module may implement the switch-on timer alternatively by a counter circuit module that counts the number of clock cycles, a digital-to-analog conversion circuit module, a comparator circuit module and a reset circuit module. In this case, upon receiving a switch-on signal, the counter circuit module may start counting the number of clock cycles of a clock signal, and the M-bit digital-to-analog conversion circuit module may convert the number of cycles into a corresponding voltage signal, followed by a comparison carried out between the voltage signal and the voltage of the filtered signal by the comparator circuit module. Upon the voltage signal reaching the voltage of the filtered signal, a switch-off signal may be output. When receiving the switch-off signal, the reset circuit module may reset the counter circuit module. Those skilled in the art will appreciate that the circuit structures operating the switch-on timer based on the filtered signal and outputting the switch-off signal are both considered as particular examples of the switch-off signal generation module.

Next, the switching circuit may be caused to be switched off based on the switch-off signal. For example, as shown in FIG. 7, the switching circuit may include a gate-driven switching element and the driving unit, and the control module may include a flip-flop having a reset terminal coupled to the switch-off signal generation module. When receiving the switch-off signal, the reset flip-flop may be caused to output a low level (i.e., the switch-off signal) to the switching circuit.

It is to be noted that the above-described method of outputting the switch-off signal from the control module is merely exemplary, and should not be construed to limit the scope of the present application in any sense. Indeed, the control module may output the switch-off signal depending on the voltage of an electrical signal as required by the switching element (e.g., a switching power transistor) in the switching circuit to fulfill the switch-off operation.

In the application in a driving system for, e.g., an LED light, in order to provide the LED light with a stable power supply, the driving system may include a power conversion circuit and provide the load with a stable power supply based on electromagnetic oscillations produced from current variations caused by switch-on and switch-off operations of the switching circuit. In the control unit in the switching control circuit, a switch-on signal generation module for indicating the switching circuit to be switched on may be further integrated.

The switching control method may further include the steps of: detecting a demagnetization process in the power conversion circuit coupled to the switching circuit and outputting a switch-on signal based on a detected demagnetization signal; and indicating, based on a control logic of the switch-off and switch-on signals, the switching circuit to be switched off or on.

In particular, the switch-on signal generation module in the switching control circuit may determine whether demagnetization of an inductor in the power conversion circuit 33 has been completed through detecting an electrical signal indicative of a current in the inductor and output a switch-on signal based on the detected demagnetization signal. The electrical signal detected by the switch-on signal generation module may be either an analog sample signal acquired by the filtering unit or an electrical signal obtained from the switching circuit.

To this end, the switch-on signal generation module may include a demagnetization detection sub-module configured to probe the demagnetization process in the power conversion circuit coupled to the switching circuit and generate the demagnetization signal. In particular, the demagnetization detection sub-module may determine the completion of the demagnetization process and generate the demagnetization signal (or deactivate the normally active demagnetization signal) when detecting a voltage valley of the electrical signal. The demagnetization signal may be output to the control module as the switch-on signal.

The control module may be configured to cause the switching circuit to be switched off or on based on a control logic of the switch-off and switch-on signals. For example, the control module may include a flip-flop having a reset terminal for receiving the switch-off signal and a set terminal for receiving the switch-on signal. The switching circuit may be caused to be switched on when the switch-on signal is active, or caused to be switched off when the switch-off signal is active.

In some embodiments, in order to enable the power supply capabilities of the power conversion circuit to address the load's power supply need, the switch-on signal generation module may start a delay timer at the same time as it detects the demagnetization signal or a certain period of time later and output the switch-on signal based on both the detected demagnetization signal and a delay indication signal. To this end, in addition to the demagnetization detection sub-module, the switch-on signal generation module may further include a switch-on delay sub-module and a switch-on signal generation sub-module.

The switch-on delay sub-module may be configured to start the delay timer based on the switch-off signal for the switching circuit and output the delay indication signal upon expiry of the delay timer. In particular, the switch-on delay sub-module may start the delay timer when receiving the switch-off signal, or when receiving both the switch-off signal and the demagnetization signal, and output the delay indication signal when the delay timer expires. Depending on the load's power supply need and the power conversion circuit's power supply capabilities, the duration of the delay timer may be either greater or smaller than the duration required for the demagnetization detection.

Similar to the circuit structure of the switch-off signal generation module, during the running of the delay timer, the switch-on delay sub-module may generate a voltage signal corresponding to the timer value, and output the delay indication signal when determining the expiry of the delay timer based on a predefined threshold voltage, a threshold voltage determined by a detected sample signal from the load or a threshold voltage determined by a conditioning signal from the previous circuit (e.g., a PWM signal).

Similar to the circuit structure of the switch-off signal generation module, the switch-on delay sub-module may reset the internal delay timer based on the generated delay indication signal or the fed-back switch-off signal.

The switch-on signal generation sub-module may be configured to output the switch-on signal based on a control logic of the received demagnetization signal and delay indication signal. In particular, the switch-on signal generation sub-module may include a set of logic elements grouped according to a predefined logic, and output the switch-on signal when detecting the demagnetization signal and delay indication signal, which are both active. The logic elements may include, but are not limited to, at least one of AND gates, OR gates, NAND gates, NOT gates, encoders, decoders, selectors, latches, etc. or various combination thereof. For example, the switch-on signal generation sub-module may include an AND gate and a latch. The latch may output a latch signal based on the demagnetization signal, and the AND gate may receive both the latch signal from the latch and the delay indication signal and output a high level as the switch-on signal when both the latch signal and the delay indication signal are high-level signals.

The switch-on signal generated by the switch-on signal generation sub-module may be fed to the control module, so that the control module can cause the switching circuit to be switched off or on based on the control logic of the switch-off and switch-on signals. For example, when the switch-off signal is received, the control module may cause the switching circuit to be switched off, and when the switch-on signal is received, the control module may cause the switching circuit to be switched on.

Figure 15:
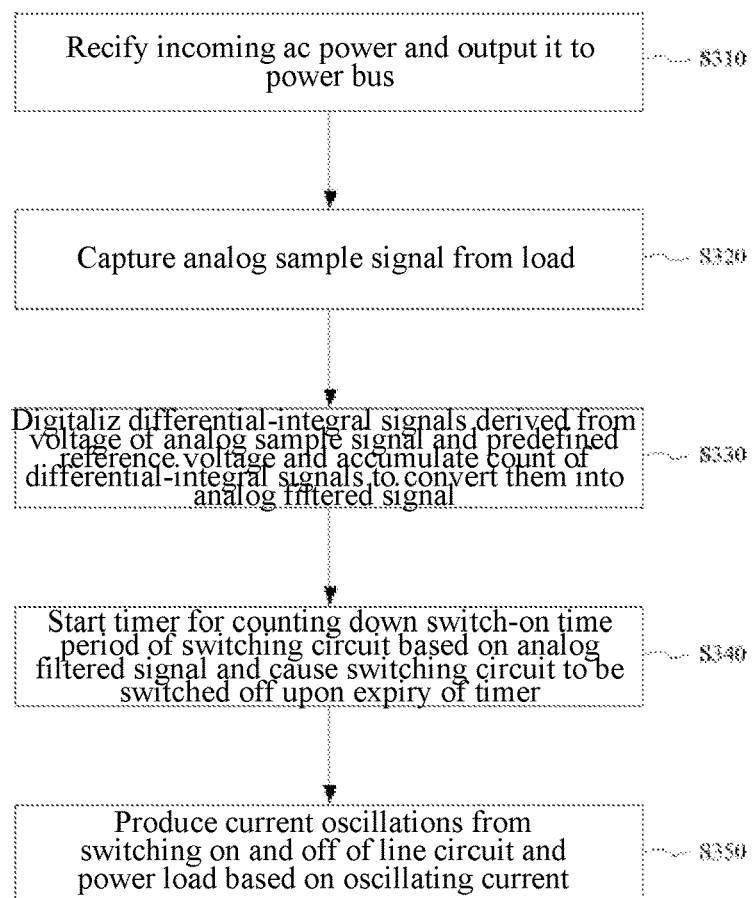
FIG. 15 shows a flowchart of a driving method according to an embodiment of the present application.

Reference is now made to FIG. 15, a flowchart of a driving method according to an embodiment of the present application. The driving method can be implemented by the above-described driving system or by any other driving system suitable for implementing this method.

In step S310, the AC power provided is rectified and output to a power bus.

The provided AC power may be rectified and output to the power bus by a rectifier circuit. As shown in FIG. 12, the rectifier circuit 41 may include a diode bridge rectifier and a capacitor, which are configured to rectify the AC power into a half-sine wave and output it to the power bus. A switching circuit for a line circuit (i.e., a line for provide a power supply to a load) connected to the power bus may be switched on and off under the control of a chip incorporating the switching control circuit. The switching control circuit may be configured to carry out the following steps S320 to S340.

In step S320, an analog sample signal is acquired from the load.

In step S330, differential-integral signals derived from a voltage of the analog sample signal and a predefined reference voltage are digitalized, and a count of the differential-integral signals is accumulated, thereby converting them into an analog filtered signal.

In step S340, a timer for counting down a switch-on time period of the switching circuit is started based on the analog filtered signal, and the switching circuit is caused to be switched off upon expiry of the timer.

It is to be noted that steps S320 to S340 correspond to the above-described steps S210 to S230, so a repeated description of them can be dispensed with. The switching control circuit accomplishes switching on and off of the line circuit through indicating switching on and off of the switching circuit.

In step S350, current oscillations are produced from switching on and off of line circuit, and the load is powered based on the oscillating current.

The current oscillations, based on which the load is powered, may be produced by a power conversion circuit in the line circuit. The power conversion circuit may include, for example, an LC power conversion circuit.

In summary, by using electrical components that can be more easily integrated and by generating a low-pass filtered signal through performing differential-integral processes and accumulating a count of the resulting differential-integral signals, the low-pass filter provided in the present application solves the problem of a low integration degree of circuits in conventional driving systems, reduces the complexity of external circuits for such driving systems and increases their circuit stability.

The embodiments disclosed hereinabove are solely for the purpose of exemplary illustration of the principles and benefits of the present application and not for the purpose of limiting the application. Any person familiar with the art can make modifications or changes to the disclosed embodiments without departing from the spirit and scope of this application. Accordingly, any and all equivalent modifications or changes made by any person with general common knowledge in the art without departing from the spirit and teachings of the present application are intended to be embraced within the scope as defined by the appended claims.

What is claimed is:

1. A low-pass filter, comprising:
 a differential-integral module configured to generate, depending on a differential-integral signal of a previous unit interval, a first differential signal based on a voltage of an analog sample signal and a second differential signal based on a predefined voltage, to perform an integral process on the first differential signal and the second differential signal, and to generate a differential-integral signal of a current unit interval based on the integrated signals and feed the differential-integral signal of the current unit interval back to the differential-integral module; and a digital-to-analog conversion module connected to the differential-integral module, the digital-to-analog conversion module configured to perform an additive counting operation or a subtractive counting operation on the differential-integral signal generated by the differential-integral module, and to convert a result of the additive or subtractive counting operation into an analog signal.

2. The low-pass filter according to claim 1, wherein the differential-integral module comprises:
   a first signal processing sub-module configured to perform a differential process on the voltage of the analog sample signal and generate the first differential signal, depending on one of a first reference voltage and a second reference voltage selected according to the differential-integral signal of the previous unit interval; and
   a second signal processing sub-module configured to perform a differential process on the predefined voltage and generate the second differential signal, depending on the other of the first reference voltage and the second reference voltage selected according to the differential-integral signal of the previous unit interval.

3. The low-pass filter according to claim 2, wherein the differential-integral module further comprises a control signal generation sub-module coupled to both the first and second signal processing sub-modules, the control signal generation sub-module configured to generate, depending on the differential-integral signal of the previous unit interval, a first control signal and a second control signal inverted with respect to the first control signal, and to input the first and second control signals respectively to the first signal processing sub-module and the second signal processing sub-module;
   wherein the first signal processing sub-module is configured to perform the differential process on the voltage of the analog sample signal and one of the first reference voltage and the second reference voltage selected under control of the first control signal; and
   wherein the second signal processing sub-module is configured to perform the differential process on the predefined voltage and the other of the first reference voltage and the second reference voltage selected under control of the second control signal.

4. The low-pass filter according to claim 2,
   wherein the first signal processing sub-module comprises:
   a first switching sub-module configured to select one of the first reference voltage and the second reference voltage depending on the differential-integral signal of the previous unit interval, and
   a first operation sub-module coupled to the first switching sub-module, the first operation sub-module configured to receive the analog sample signal and perform a differential process on the voltage of the analog signal and a reference voltage selected by the first switching sub-module to generate the first differential signal; and
   wherein the second signal processing sub-module comprises:
   a second switching sub-module configured to select the other of the first reference voltage and the second reference voltage depending on the differential-integral signal of the previous unit interval, and
   a second operation sub-module coupled to the second switching sub-module, the second operation sub-module configured to perform a differential process on the predefined voltage and a reference voltage selected by the second operation sub-module to generate the second differential signal.

5. The low-pass filter according to claim 4, wherein when the differential-integral signal of the previous unit interval is at a high level, the first switching sub-module selects the first reference voltage and the second switching sub-module selects the second reference voltage; when the differential-integral signal of the previous unit interval is at a low level, the first switching sub-module selects the second reference voltage and the second switching sub-module selects the first reference voltage.

6. The low-pass filter according to claim 2, wherein the differential-integral module further comprises:
   an integration sub-module configured to receive the first and second differential signals and perform an integral process to generate a first integrated signal and a second integrated signal respectively; and
   a comparison sub-module configured to compare the first integrated signal and the second integrated signal from the integration sub-module and output, based on the comparison, the differential-integral signal of the current unit interval and feed the differential-integral signal of the current unit interval back to the first signal processing sub-module and the second signal processing sub-module.

7. The low-pass filter according to claim 2, wherein the first reference voltage and the second reference voltage are selected from a step voltage and a ground voltage respectively.

8. The low-pass filter according to claim 1, wherein the analog sample signal is an analog signal sampled from an LED load, and the differential-integral signal is a 1-bit digital signal, wherein only one differential-integral signal is generated in each unit interval.

9. A switching control circuit for controlling a switching circuit which is configured to switch on or off a line circuit connected to a power bus, the switching control circuit comprising:
   a low-pass filter comprising:
      a differential-integral module configured to generate, depending on a differential-integral signal of a previous unit interval, a first differential signal based on a voltage of an analog sample signal and a second differential signal based on a predefined voltage, to perform an integral process on the first differential signal and the second differential signal, and to generate a differential-integral signal of a current unit interval based on the integrated signals and feed the differential-integral signal of the current unit interval back to the differential-integral module; and
      a digital-to-analog conversion module connected to the differential-integral module, the digital-to-analog conversion module configured to perform an additive counting operation or a subtractive counting operation on the differential-integral signal generated by the differential-integral module, and to convert a result of the additive or subtractive counting operation into an analog signal; and
   a control unit coupled to the low-pass filter, the control unit configured to count a switch-on time period of the switching circuit based on the analog signal and to control the switching circuit to be switched off upon expiry of the switch-on time period.

10. The switching control circuit according to claim 9, wherein the differential-integral module comprises:

a first signal processing sub-module configured to perform a differential process on the voltage of the analog sample signal and generate the first differential signal, depending on one of a first reference voltage and a second reference voltage selected according to the differential-integral signal of the previous unit interval; and a second signal processing sub-module configured to perform a differential process on the predefined voltage and generate the second differential signal, depending on the other of the first reference voltage and the second reference voltage selected according to the differential-integral signal of the previous unit interval.

11. The switching control circuit according to claim 10, the differential-integral module further comprises a control signal generation sub-module coupled to both the first and second signal processing sub-modules, the control signal generation sub-module configured to generate, depending on the differential-integral signal of the previous unit interval, a first control signal and a second control signal inverted with respect to the first control signal, and to input the first and second control signals respectively to the first signal processing sub-module and the second signal processing sub-module;

wherein the first signal processing sub-module is configured to perform the differential process on the voltage of the analog sample signal and one of the first reference voltage and the second reference voltage selected under control of the first control signal; and wherein the second signal processing sub-module is configured to perform the differential process on the predefined voltage and the other of the first reference voltage and the second reference voltage selected under control of the second control signal.

12. The switching control circuit according to claim 10, wherein the first signal processing sub-module comprises:

a first switching sub-module configured to select one of the first reference voltage and the second reference voltage depending on the differential-integral signal of the previous unit interval, and a first operation sub-module coupled to the first switching sub-module, the first operation sub-module configured to receive the analog sample signal and perform a differential process on the voltage of the analog signal and a reference voltage selected by the first switching sub-module to generate the first differential signal; and wherein the second signal processing sub-module comprises:

a second switching sub-module configured to select the other of the first reference voltage and the second reference voltage depending on the differential-integral signal of the previous unit interval; and a second operation sub-module coupled to the second switching sub-module, the second operation sub-module configured to perform a differential process on the predefined voltage and a reference voltage selected by the second operation sub-module to generate the second differential signal.

13. The switching control circuit according to claim 12, wherein when the differential-integral signal of the previous unit interval is at a high level, the first switching sub-module selects the first reference voltage and the second switching sub-module selects the second reference voltage; when the differential-integral signal of the previous unit interval is at a low level, the first switching sub-module selects the second reference voltage and the second switching sub-module selects the first reference voltage.

14. The switching control circuit according to claim 10, wherein the differential-integral module further comprises:

an integration sub-module configured to receive the first and second differential signals and perform an integral process to generate a first integrated signal and a second integrated signal respectively; and a comparison sub-module configured to compare the first integrated signal and the second integrated signal from the integration sub-module and output, based on the comparison, the differential-integral signal of the current unit interval and feed the differential-integral signal of the current unit interval back to the first signal processing sub-module and the second signal processing sub-module.

15. The switching control circuit according to claim 10, wherein the first reference voltage and the second reference voltage are selected from a step voltage and a ground voltage respectively.

16. The switching control circuit according to claim 9, wherein the analog sample signal is an analog signal sampled from an LED load, and the differential-integral signal is a 1-bit digital signal, wherein only one differential-integral signal is generated in each unit interval.

17. The switching control circuit according to claim 9, wherein the control unit comprises:

a switch-off signal generation module configured to start a timer for counting down the switch-on time period upon the switching circuit being switched on and to generate a switch-off signal when it is determined based on the analog signal that the timer has expired;

a switch-on signal generation module configured to detect a demagnetization process in a power conversion circuit coupled to the switching circuit and to output a switch-on signal after the demagnetization process is finished; and a control module configured to control the switching circuit based on the switch-off and switch-on signals.

18. The switching control circuit according to claim 17, wherein the switch-on signal generation module comprises:

a demagnetization detection sub-module configured to detect the demagnetization process in the power conversion circuit coupled to the switching circuit and output a demagnetization signal indicating when the demagnetization process is finished, a delay sub-module configured to start a delay timer upon receiving the switch-off signal for the switching circuit and output a delay indication signal upon expiry of the delay timer, and a switch-on signal generation sub-module configured to output the switch-on signal based on the demagnetization signal and the delay indication signal.

19. A chip comprising a switching control circuit for controlling a switching circuit which is configured to switch on or off a line circuit connected to a power bus, the switching control circuit comprising:

a low-pass filter comprising:

a differential-integral module configured to generate, depending on a differential-integral signal of a previous unit interval, a first differential signal based on a voltage of an analog sample signal and a second differential signal based on a predefined voltage, to perform an integral process on the first differential signal and the second differential signal, and to generate a differential-integral signal of a current unit interval based on the integrated signals and feed the differential-integral signal of the current unit interval back to the differential-integral module; and a digital-to-analog conversion module connected to the differential-integral module, the digital-to-analog conversion module configured to perform an additive counting operation or a subtractive counting operation on the differential-integral signal generated by the differential-integral module, and to convert a result of the additive or subtractive counting operation into an analog signal; and a control unit coupled to the low-pass filter, the control unit configured to count a switch-on time period of the switching circuit based on the analog signal and to control the switching circuit to be switched off upon expiry of the switch-on time period.

* * * * *